US012647846B2

(12) United States Patent
Yang et al.

(10) Patent No.:    US 12,647,846 B2
(45) Date of Patent:         Jun. 2, 2026

(54) NETWORK HANDOVER METHOD AND ELECTRONIC DEVICE

(71) Applicant: HUAWEI TECHNOLOGIES CO., LTD., GuangDong (CN)

(72) Inventors: Rui Yang, Beijing (CN); Fenghui Dou, Beijing (CN); Hui Jin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 979 days.

(21) Appl. No.: 17/838,168

(22) Filed: Jun. 11, 2022

(65) Prior Publication Data

US 2022/0303861 A1      Sep. 22, 2022

Related U.S. Application Data

(63) Continuation of application No. PCT/CN2020/128113, filed on Nov. 11, 2020.

(30) Foreign Application Priority Data

Dec. 11, 2019    (CN) .......................... 201911269176.6

(51) Int. Cl.
*H04W 36/00*          (2009.01)
*H04W 36/14*          (2009.01)
        (Continued)

(52) U.S. Cl.
CPC .................. *H04W 36/0061* (2013.01); *H04W 36/008375* (2023.05); *H04W 36/00838* (2023.05);
        (Continued)

(58) Field of Classification Search
CPC ..... H04W 36/0061; H04W 36/008375; H04W 36/00838; H04W 36/302; H04W 36/322;
        (Continued)

(56) References Cited

U.S. PATENT DOCUMENTS

2017/0135104 A1      5/2017   Emmanuel et al.
2018/0124664 A1      5/2018   Lei et al.
        (Continued)

FOREIGN PATENT DOCUMENTS

CN          102395100 A      3/2012
CN          103200633 A      7/2013
        (Continued)

*Primary Examiner* — Marisol Figueroa
(74) *Attorney, Agent, or Firm* — Rimon PC

(57)          ABSTRACT

In a network handover method disclosed in this application, when an electronic device accesses a first mobile network by using the first SIM card, the electronic device obtains network information of the first mobile network in a process in which the electronic device moves along a first route. When the electronic device predicts, according to the obtained network information of the first mobile network, that an exception is going to occur in the first mobile network, the electronic device accesses the second mobile network by using the second SIM card. In this technical solution, an electronic device having a dual SIM card can be handed over from a first mobile network to a second mobile network in advance when it is predicted that an exception is going to occur in the first mobile network, thereby reducing the possibility of frame freezing or network disconnecting when a user accesses the Internet.

18 Claims, 8 Drawing Sheets

When a first SIM card is enabled, a mobile phone detects, at an $(n-i)^{th}$ time, that the mobile phone leaves a first location, and obtains network information of a sampling point every specific duration — 701

After detecting that the mobile phone arrives at a second location, the mobile phone stops obtaining the network information — 702

The mobile phone determines a sample 0 based on the network information that is of the sampling point and that is obtained in a process in which the mobile phone moves along the first route at the $(n-i)^{th}$ time — 703

(51) Int. Cl.

| *H04W 36/30* | (2009.01) |
|---|---|
| *H04W 36/32* | (2009.01) |
| *H04W 48/18* | (2009.01) |
| *H04W 68/02* | (2009.01) |
| *H04W 88/06* | (2009.01) |

(52) U.S. Cl.
CPC ....... *H04W 36/302* (2023.05); *H04W 36/322* (2023.05); *H04W 36/142* (2023.05); *H04W 48/18* (2013.01); *H04W 68/02* (2013.01); *H04W 88/06* (2013.01)

(58) Field of Classification Search
CPC ... H04W 36/142; H04W 48/18; H04W 68/02; H04W 88/06; H04W 48/20; H04W 8/183; H04W 36/0085
See application file for complete search history.

(56) References Cited

U.S. PATENT DOCUMENTS

2018/0299280 A1* 10/2018 Kumar ............... G01C 21/3694

2019/0149425 A1    5/2019  Larish et al.
2020/0112899 A1*   4/2020  Mysore Annaiah  ........................
                                                         H04W 36/0085

FOREIGN PATENT DOCUMENTS

| CN | 105319482 | A | 2/2016 |
|---|---|---|---|
| CN | 105466435 | A | 4/2016 |
| CN | 106068015 | A | 11/2016 |
| CN | 106604258 | A | 4/2017 |
| CN | 107205225 | A | 9/2017 |
| CN | 108174425 | A | 6/2018 |
| CN | 108370493 | A | 8/2018 |
| CN | 109842908 | A | 6/2019 |
| CN | 109890067 | A | 6/2019 |
| CN | 109902832 | A | 6/2019 |
| CN | 110072263 | A | 7/2019 |
| EP | 3300553 | A1 | 4/2018 |
| JP | 2007274315 | A | 10/2007 |
| JP | 2016158118 | A | 9/2016 |
| WO | 2014151583 | A1 | 9/2014 |
| WO | 2015050708 | A1 | 4/2015 |
| WO | 2017001219 | A1 | 1/2017 |
| WO | 2018138894 | A1 | 8/2018 |

* cited by examiner

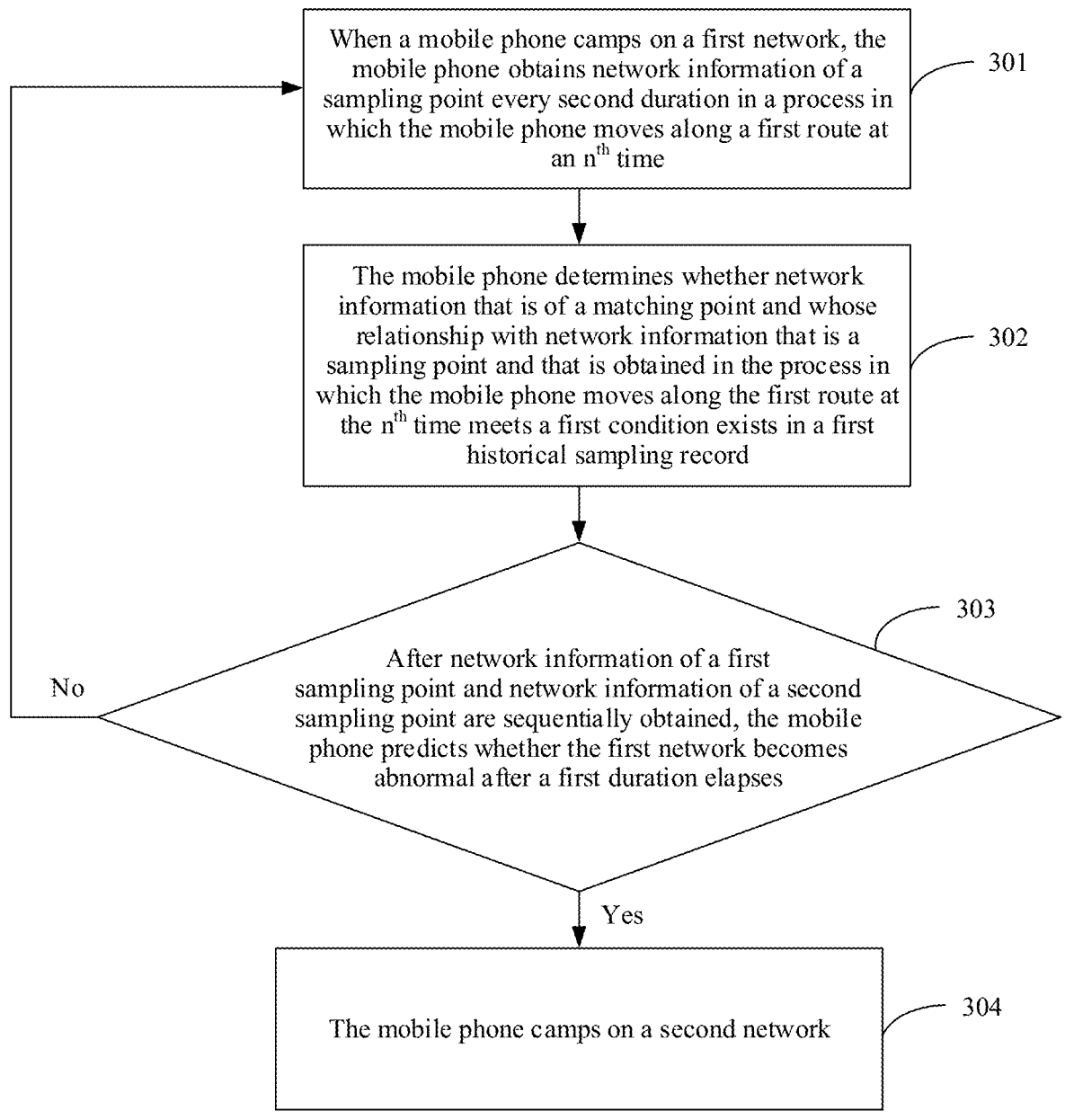

When a mobile phone camps on a first network, the mobile phone obtains network information of a sampling point every second duration in a process in which the mobile phone moves along a first route at an $n^{th}$ time ⟍ 301

The mobile phone determines whether network information that is of a matching point and whose relationship with network information that is a sampling point and that is obtained in the process in which the mobile phone moves along the first route at the $n^{th}$ time meets a first condition exists in a first historical sampling record ⟍ 302

After network information of a first sampling point and network information of a second sampling point are sequentially obtained, the mobile phone predicts whether the first network becomes abnormal after a first duration elapses ⟍ 303

No

Yes

The mobile phone camps on a second network ⟍ 304

FIG. 3

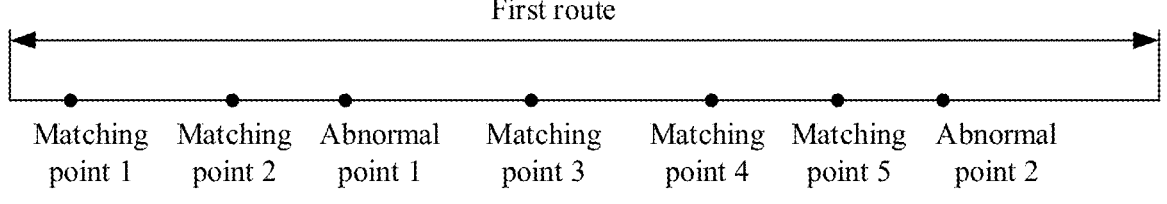

FIG. 5

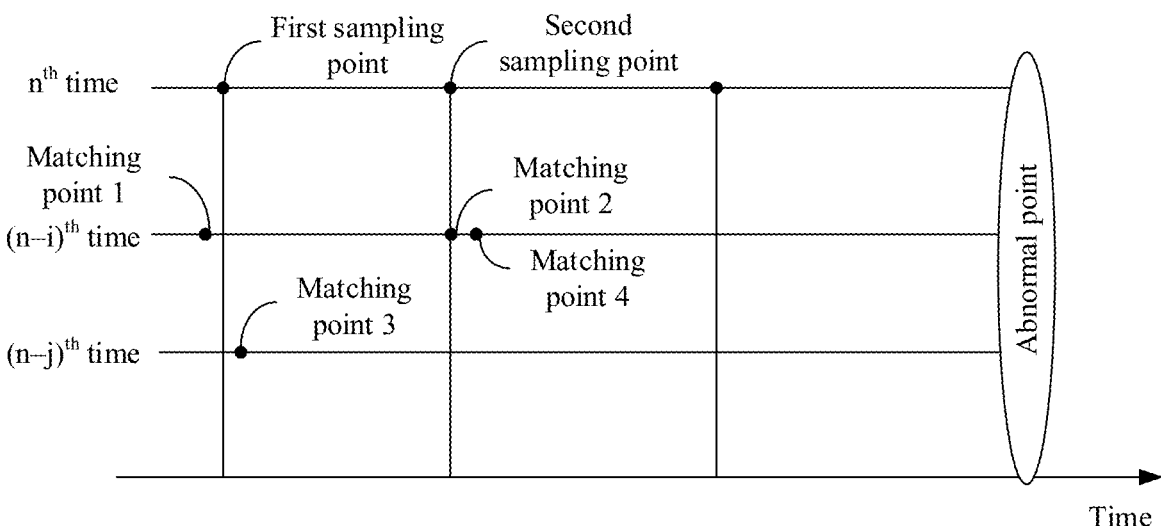

FIG. 6

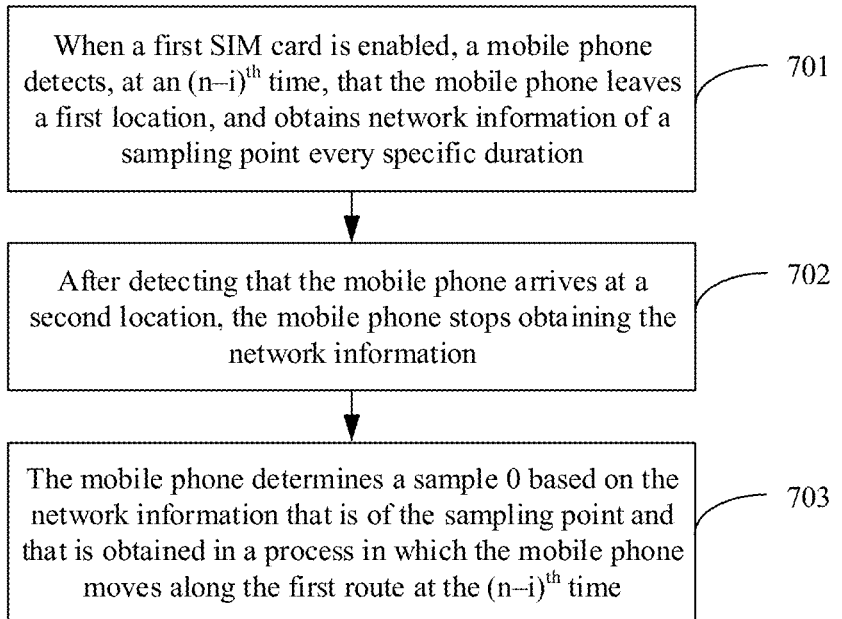

When a first SIM card is enabled, a mobile phone detects, at an $(n-i)^{th}$ time, that the mobile phone leaves a first location, and obtains network information of a sampling point every specific duration — 701

After detecting that the mobile phone arrives at a second location, the mobile phone stops obtaining the network information — 702

The mobile phone determines a sample 0 based on the network information that is of the sampling point and that is obtained in a process in which the mobile phone moves along the first route at the $(n-i)^{th}$ time — 703

FIG. 7

When an electronic device camps on a first network, the electronic device sequentially obtains network information of a first sampling point and network information of a second sampling point for the first network in a process in which the electronic device moves along a first route at an $n^{th}$ time

1001

After the electronic device obtains the network information of the second sampling point, if the electronic device predicts, based on the network information of the first sampling point, the network information of the second sampling point, and a first historical sampling record, that the first network becomes abnormal after first duration elapses, before the first network becomes abnormal, the electronic device camps on a second network

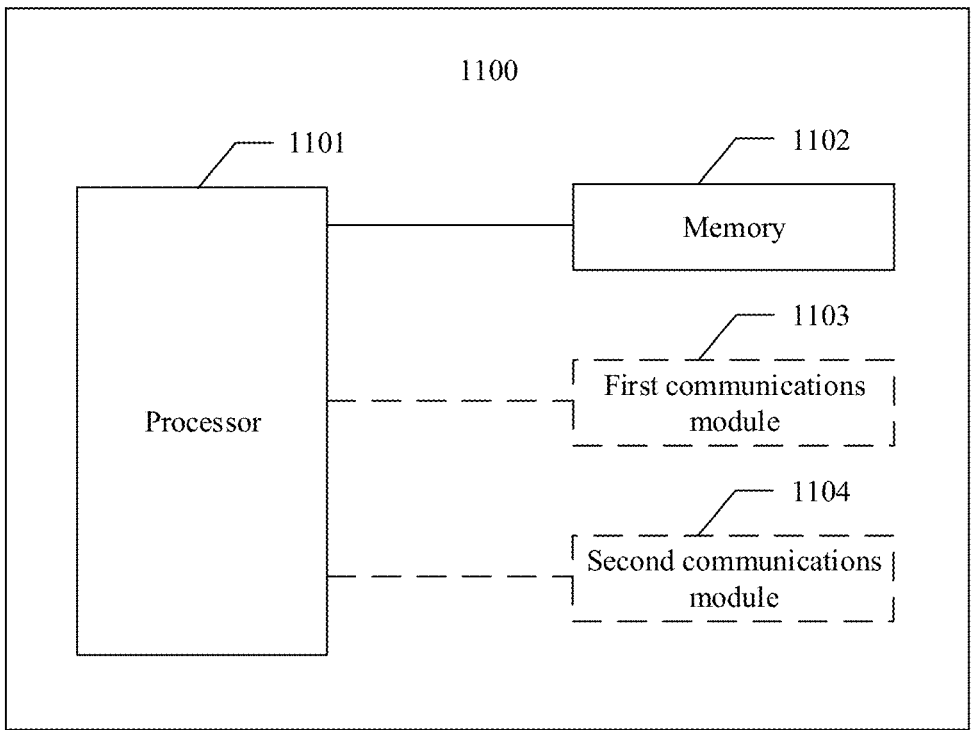

1100

1101

Processor

1102

Memory

1103

First communications module

1104

Second communications module

FIG. 11

NETWORK HANDOVER METHOD AND ELECTRONIC DEVICE

CROSS-REFERENCE TO RELATED APPLICATION

This application is a continuation of International Application No. PCT/CN2020/128113, filed on Nov. 11, 2020, which claims priority to Chinese Patent Application No. 201911269176.6, filed on Dec. 11, 2019. The disclosures of the aforementioned applications are hereby incorporated by reference in their entireties.

TECHNICAL FIELD

This application relates to the field of terminal technologies, and in particular, to a network handover method.

BACKGROUND

After a mobile phone accesses a mobile network, the mobile phone may provide a network access service for a user. Specifically, the mobile phone accesses the mobile network by using a subscriber identity module (SIM) card. However, in an area with no coverage or weak coverage, the mobile phone is easily dropped from a network or easily falls into a lower or older standard. Consequently, it is possible that the user cannot use the network access service, and user experience is affected. Especially, at an initial stage of network construction, a phenomenon of no coverage or weak coverage becomes more obvious.

Currently, the mobile phone usually supports dual SIM cards. Therefore, the mobile phone may separately access the mobile network based on two SIM cards (for example, a SIM card 1 and a SIM card 2), and provide the network access service for the user by using the SIM card 1. In other words, the mobile network currently used by the mobile phone is accessed based on the SIM card 1. In the conventional technology, after the mobile phone is dropped from a currently used mobile network or falls into a lower or older standard, the mobile phone is handed over to a mobile network accessed based on the SIM card 2, to avoid a case in which the user cannot use the network access service and user experience is affected. However, the existing network handover manner is an after-event remedy, frame freezing or a temporary network disconnection is easily caused when the user accesses a network by using the mobile phone, and user experience is poor.

SUMMARY

Embodiments of this application provide a network handover method, to help reduce a possibility that frame freezing or a network disconnection of an electronic device occurs when a user accesses a network by using the electronic device, and improve user experience.

According to a first aspect, an embodiment of this application provides a network handover method. Specifically, the method includes the following steps.

When an electronic device camps on a first network accessed by using a first communications module, the electronic device sequentially obtains network information of a first sampling point and network information of a second sampling point for the first network in a process in which the electronic device moves along a first route at an $n^{th}$ time, where the first route is a route between a first location and a second location;

after obtaining the network information of the second sampling point, the electronic device predicts, based on the network information of the first sampling point, the network information of the second sampling point, and a first historical sampling record, whether the first network becomes abnormal after a first duration when the electronic device moves along the first route at the $n^{th}$ time, where the first historical sampling record includes network information obtained by the electronic device for the first network at sample points each time before the nth time the electronic device moves along the first route each time, and n is a positive integer greater than 1; and if the electronic device predicts that the first network becomes abnormal, the electronic device camps, when the electronic device moves along the first route at the $n^{th}$ time and before the first network becomes abnormal (namely, before the first duration expires), on a second network accessed by using a second communications module.

In an embodiment of this application, after collecting the network information of the second sampling point, the electronic device may predict whether the first network becomes abnormal after the first duration. Therefore, when predicting that the first network becomes abnormal after the first duration, the electronic device may be handed over to the second network in advance. In comparison with the conventional technology, this helps reduce a possibility that frame freezing or a network disconnection occurs when a user accesses a network by using the electronic device, thereby improving user experience.

In a possible design, the first historical sampling record includes network information of a first matching point, network information of a second matching point, and network information of a first abnormal point; the network information of the first matching point and the network information of the second matching point each are network information of sampling points at which the probability that the first network becomes abnormal is less than or equal to a first threshold and are sequentially and separately obtained by the electronic device for the first network in a process in which the electronic device moves along the first route at an $(n-i)^{th}$ time, where i is a positive integer less than n; and the network information of the first abnormal point is network information of a sampling point at which the probability that the first network becomes abnormal is greater than or equal to a second threshold and is the latest obtained by the electronic device for the first network after the electronic device obtains the network information of the second matching point in the process in which the electronic device moves along the first route at the $(n-i)^{th}$ time; and the network information of the first sampling point and the network information of the first matching point meet a first condition, the network information of the second sampling point and the network information of the second matching point meet the first condition, the first condition is used to indicate that the distance between a first physical sampling location and a second physical sampling location falls within an error range, the first physical sampling location is a physical location corresponding to a sampling point in the process in which the electronic device moves along the first route at the $n^{th}$ time, and the second physical sampling location is a physical location corresponding to a matching point in a process in which the electronic device moves along the first route before the $n^{th}$ time.

The foregoing technical solution is used to help improve reliability of predicting whether the first network becomes abnormal after the first duration.

In a possible design, the network information of the first sampling point and the network information of the first matching point meet the first condition when two or more of the following items are met:

in the network information of the first sampling point and the network information of the first matching point, there is a same serving cell identifier, the difference between network signal strengths of a serving cell falls within a first range, there is the same neighboring cell identifier, and the difference between network signal strengths of a same neighboring cell falls within a second range; and the network information of the second sampling point and the network information of the second matching point meet the first condition when two or more of the following items are met:

in the network information of the second sampling point and the network information of the second matching point, there is the same serving cell identifier, the difference between network signal strengths of the serving cell falls within the first range, there is the same neighboring cell identifier, and the difference between network signal strengths of a same neighboring cell falls within the second range.

According to the foregoing technical solution, the electronic device does not need to obtain a physical location corresponding to a sampling point, to help reduce power consumption of the electronic device to some extent.

In a possible design, network information of any sampling point includes a system time of the electronic device at a corresponding sampling point.

The electronic device may predict, in the following manner based on the network information of the first sampling point, the network information of the second sampling point, and a historical sampling record, whether the first network becomes abnormal after the first duration when the electronic device moves along the first route at the $n^{th}$ time:

The electronic device determines, based on system times separately included in the network information of the first sampling point, the network information of the second sampling point, the network information of the first matching point, the network information of the second matching point, and the network information of the first abnormal point, that the first network becomes abnormal after second duration when the electronic device moves along the first route at the $n^{th}$ time; then determines whether the second duration is greater than the first duration; and if the second duration is less than or equal to the first duration, predicts that the first network becomes abnormal after the first duration when the electronic device moves along the first route at the $n^{th}$ time. Further, if the second duration is greater than the first duration, the electronic device predicts that the first network does not become abnormal after the first duration when the electronic device moves along the first route at the $n^{th}$ time.

The foregoing technical solution is used to help simplify an implementation of predicting whether the first network becomes abnormal after the first duration.

In a possible design, the second duration satisfies the following expression:

$$\frac{T2-T1}{T3-T2} = \frac{T2'-T1'}{\tau}.$$

4

Herein, $\tau$ is the second duration, T1 is a system time of the electronic device at the first matching point, T2 is a system time of the electronic device at the second matching point, T3 is a system time of the electronic device at the first abnormal point, T1' is a system time of the electronic device at the first sampling point, and T2' is a system time of the electronic device at the second sampling point.

In a possible design, the first historical sampling record further includes network information of a third matching point, and the network information of the third matching point is network information of a sampling point at which the probability that the first network becomes abnormal is less than or equal to the first threshold and is obtained by the electronic device in a process in which the electronic device moves along the first route at the $(n-j)^{th}$ time, where j is a positive integer not equal to i but less than n; and when the network information of the first sampling point and the network information of the third matching point meet the first condition, a signal strength error between the first sampling point and the first matching point is less than or equal to a signal strength error between the first sampling point and the third matching point.

In an embodiment of this application, when the network information of the first sampling point, the network information of the first matching point, and the network information of the third matching point of the electronic device all meet the first condition, the electronic device determines, based on a principle that there is a smallest signal strength error, a matching point used to predict whether the first network becomes abnormal after the first duration, to help further improve prediction reliability.

In a possible design, the signal strength error between the first sampling point and the first matching point satisfies the following expression:

$$\text{Var} = C_S V_S^2 + C_N \sum_{t=1}^{r} V_{Nt}^2; \text{ or}$$

$$\text{Var} = C_S |V_S| + C_N \sum_{t=1}^{r} |V_{Nt}^2|.$$

Herein, Var is the signal strength error between the first sampling point and the first matching point, $C_S$ is an error impact factor of the serving cell, $C_N$ is an error impact factor of a neighboring cell, $C_S+C_N=1$, $V_S=P_{S1}-P_{S0}$, $P_{S1}$ is a network signal strength of the serving cell in the network information of the first sampling point, $P_{S0}$ is a network signal strength of the serving cell in the network information of the first matching point, r is a quantity of same neighboring cell identifiers in the network information of the first sampling point and the network information of the first matching point, $V_{Nt}=P_{Nt}-P_{N0t}$, $P_{Nt}$ is a network signal strength of a neighboring cell t in the network information of the first sampling point, and $P_{Ni}$ is a network signal strength of the neighboring cell t in the network information of the first matching point. The neighboring cell t is a cell identified by a $t^{th}$ same neighboring cell identifier in the network information of the first sampling point and the network information of the first matching point.

The foregoing technical solution is used to help simplify an implementation of calculating a signal strength error.

In a possible design, the first historical sampling record further includes network information of a third matching point, network information of a fourth matching point, and network information of a second abnormal point, the network information of the third matching point and the network information of the fourth matching point each are network information of a sampling point at which the probability that the first network becomes abnormal is less than or equal to the first threshold and are sequentially obtained by the electronic device in a process in which the electronic device moves along the first route at an $(n-j)^{th}$ time, and the network information of the second abnormal point is network information of a sampling point at which the probability that the first network becomes abnormal is greater than or equal to the second threshold and is the latest obtained by the electronic device after the electronic device obtains the network information of the fourth matching point in the process in which the electronic device moves along the first route at the $(n-j)^{th}$ time, where j is a positive integer not equal to i but less than n; and when the network information of the first sampling point and the network information of the third matching point further meet the first condition, and the network information of the second sampling point and the network information of the fourth matching point further meet the first condition, a time error between duration predicted based on the network information of the first matching point and duration predicted based on the network information of the second matching point is less than or equal to a time error between duration predicted based on the network information of the third matching point and duration predicted based on the network information of the fourth matching point.

In some embodiments of this application, when the network information of the first sampling point, the network information of the first matching point, and the network information of the third matching point of the electronic device all meet the first condition, and the network information of the second sampling point, the network information of the second matching point, and the network information of the fourth matching point all meet the first condition, the electronic device determines, based on a principle that there is a smallest time error, a matching point used to predict whether the first network becomes abnormal after the first duration, to help further improve prediction reliability.

In a possible design, the time error between the duration predicted based on the network information of the first matching point and the duration predicted based on the network information of the second matching point satisfies the following expression:

$$T_{var}=t_0+V_1+V_2.$$

Herein, $$t0 = \frac{(T2' - T1') - (T2 - T1)}{T2 - T1},$$

$$V_1 = \frac{Var1}{P_{max}^2} * \frac{M - L1}{M}, \text{ and}$$

$$V_2 = \frac{Var2}{P_{max}^2} * \frac{M - L2}{M}.$$

T1' is the system time of the electronic device at the first sampling point, T2' is a system time of the electronic device at the second sampling point, T1 is the system time of the electronic device at the first matching point, T2 is the system time of the electronic device at the second matching point, Var1 is a signal strength error between the first sampling point and the first matching point, Var2 is a signal strength error between the second sampling point and the second matching point, L1 is a quantity of same neighboring cell identifiers in the network information of the first sampling point and the network information of the first matching point, L2 is a quantity of same neighboring cell identifiers in the network information of the second sampling point and the network information of the second matching point, M is a maximum quantity of neighboring cell identifiers in network information of one sampling point, and $P_{max}$ is a maximum deviation between network signal strengths of a same cell that are collected in processes in which a user moves along the first route at different times.

The foregoing technical solution is used to help simplify an implementation of calculating a time error.

In a possible design, if the electronic device predicts that the first network becomes abnormal, before the first network becomes abnormal, the electronic device determines that the second network does not become abnormal, and camps on the second network. This helps reduce a quantity of times that the electronic device performs an invalid network handover.

In a possible design, the electronic device may determine, in the following manner, whether the second network is abnormal:

determining, by the electronic device based on a second historical sampling record, that the second network does not become abnormal, where the second historical sampling record is a historical sampling record for the second network; and/or separately sending, by the electronic device, a data packet through the first network and the second network, separately performing quality evaluation on the first network and the second network, and determining, based on quality evaluation results of the first network and the second network, that the second network does not become abnormal. This helps simplify an implementation of determining whether the second network is abnormal, and to some extent, further helps improve reliability of determining whether the second network is abnormal.

In a possible design, when the electronic device camps on the first network accessed by using the first communications module, after the electronic device detects that the electronic device leaves the first location, the electronic device obtains the network information of the first sampling point and the network information of the second sampling point for the first network. This helps reduce power consumption of the electronic device.

In a possible design, after the electronic device detects that the electronic device arrives at the second location, the electronic device stops collecting network information. This helps further reduce the power consumption of the electronic device.

In a possible design, after the electronic device camps on the second network accessed by using the second communications module, the electronic device re-camps on the first network when the first network is recovered to normal. To some extent, this helps reduce user overheads.

In a possible design, when the electronic device detects that a network signal strength of the first network is greater than a third threshold and/or a network standard of the first network is a first network standard, the electronic device determines that the first network is recovered to normal. This helps simplify a manner of determining whether the first network is recovered to normal. For example, the first network standard may be a highest network standard that is set by the user or supported by the electronic device. This is not limited.

In a possible design, when the electronic device camps on the first network accessed by using the first communications module, after the electronic device detects that an intelligent network handover function is enabled, the electronic device obtains the network information of the first sampling point and the network information of the second sampling point for the first network. For example, when the electronic device camps on the first network accessed by using the first communications module, after the electronic device detects that the intelligent network handover function is enabled, if the electronic device detects that the electronic device leaves the first location, the electronic device obtains the network information of the first sampling point and the network information of the second sampling point for the first network. This helps the user control the electronic device.

In a possible design, the first communications module includes a first SIM card or a first Wi-Fi module, and the second communications module includes a second SIM card or a second Wi-Fi module.

According to a second aspect, an embodiment of this application further provides an electronic device, including a processor and a memory. The memory stores program instructions. When the program instructions are executed by the electronic device, the method according to any one of the first aspect and the possible designs of the first aspect in embodiments of this application is implemented.

According to a third aspect, an embodiment of this application further provides an electronic device, including a module configured to implement the method according to any one of the first aspect and the possible designs of the first aspect in embodiments of this application.

According to a fourth aspect, an embodiment of this application provides a chip. The chip is coupled to a memory in an electronic device, so that during running, the chip invokes program instructions stored in the memory, to implement the method according to any one of the first aspect and the possible designs of the first aspect in embodiments of this application.

According to a fifth aspect, an embodiment of this application provides a computer-readable storage medium. The computer-readable storage medium stores program instructions. When the program instructions are run on an electronic device, the electronic device is enabled to perform the method according to any one of the first aspect and the possible designs of the first aspect.

According to a sixth aspect, an embodiment of this application provides a computer program product. When the computer program product is run on an electronic device, the electronic device is enabled to perform the method according to any one of the first aspect and the possible designs of the first aspect.

In addition, for technical effects of any possible design manner in the second aspect to the sixth aspect, refer to technical effects of different design manners in the first aspect. Details are not described herein again.

BRIEF DESCRIPTION OF DRAWINGS

FIG. 3 is a schematic flowchart of a network handover method according to an embodiment of this application;

FIG. 5 is a schematic diagram of a matching point according to an embodiment of this application;

FIG. 6 is a schematic diagram of another matching point according to an embodiment of this application;

FIG. 7 is a schematic flowchart of a sample obtaining method according to an embodiment of this application;

FIG. 10 is a schematic flowchart of another network handover method according to an embodiment of this application; and FIG. 11 is a schematic diagram of a structure of another electronic device according to an embodiment of this application.

DESCRIPTION OF EMBODIMENTS

Figure 1:
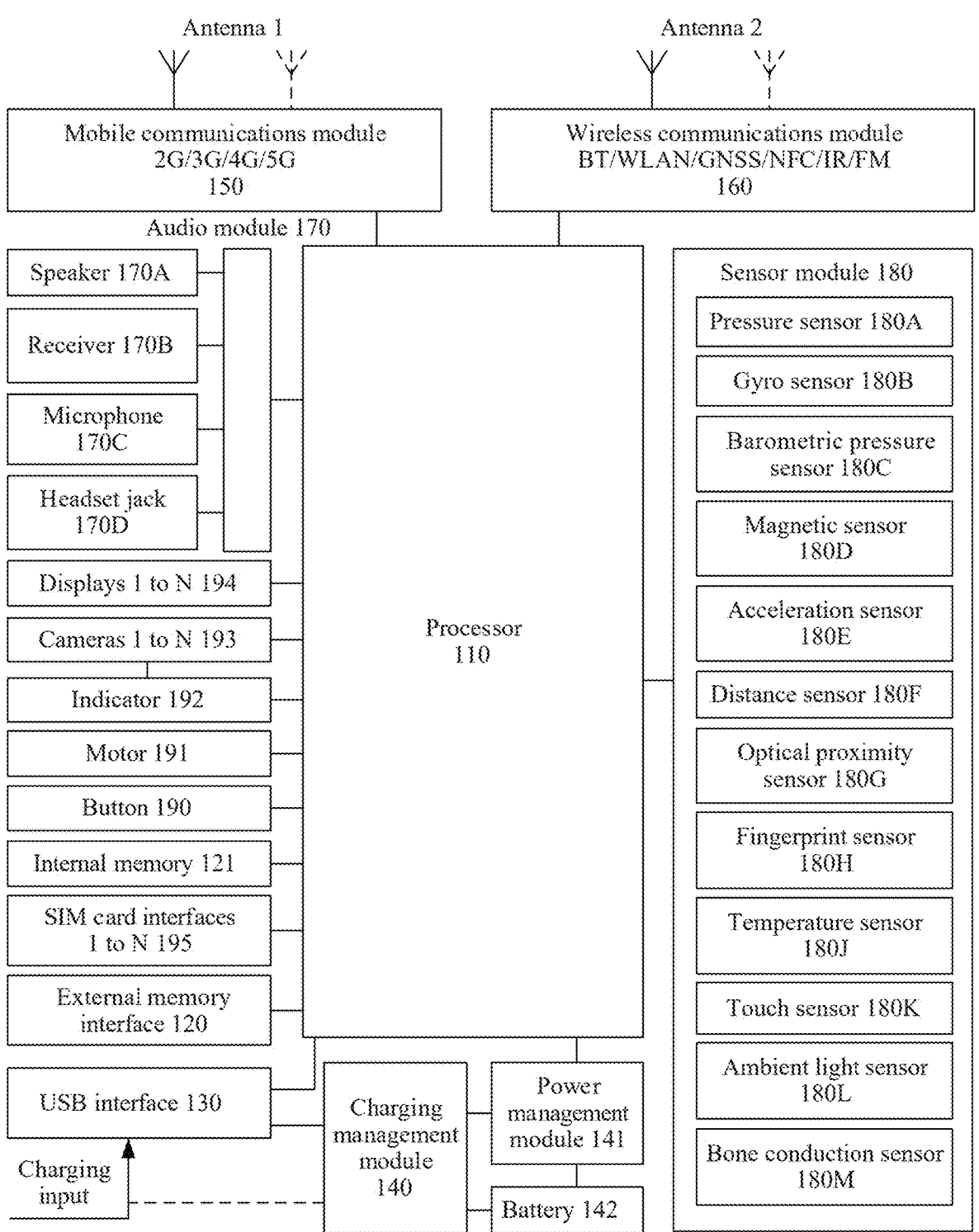
FIG. 1 is a schematic diagram of a structure of an electronic device according to an embodiment of this application.

It should be understood that, unless otherwise stated in this application, "/" means or. For example, A/B may represent A or B. "And/or" is only an association relationship for describing associated objects, and represents that there may be three relationships. For example, A and/or B may represent the following cases: Only A exists, both A and B exist, and only B exists. In addition, in this application, "a plurality of" means two or more. For example, at least one of a, b, or c may represent seven cases: a, b, c, a and b, a and c, b and c, or a, b and c.

In this application, "example", "in some embodiments", "in some other embodiments", or the like is used to represent giving an example, an illustration, or a description. Any embodiment or design solution described as an "example" in this application should not be explained as being more preferred or having more advantages than another embodiment or design solution. Exactly, the term "example" is used to present a concept in a specific manner.

It should be noted that, in embodiments of this application, the terms "first", "second", and the like are only used for distinction and description, but should not be understood as an indication or implication of relative importance or an indication or implication of a sequence.

An electronic device may support to access a network by using different communications modules. For example, the electronic device supports to access the network by using a first communications module and a second communications module. The electronic device may access a first network by using the first communications module, and access a second network by using the second communications module. However, the electronic device usually camps on one of the first network or the second network to provide a network access service for a user. For example, the electronic device camps on the first network to provide the network access service for the user. When the user watches an online video, browses a web page, plays an online game, makes a video call, or the like, data transmission is performed by using the first network. However, when the electronic device accesses the first network by using the first communications module, in an area with no coverage or weak coverage, the electronic device is easily dropped from a network or easily falls into an older or lower standard. To avoid a case in which the user cannot access a network by using the electronic device, the electronic device may be handed over to the second network after the first network becomes abnormal, in other words, camp on the second network, to continue providing the network access service for the user. However, because the electronic device performs a network handover only when a network on which the electronic device currently camps becomes abnormal (for example, the electronic device is dropped from a network or falls into an older or lower standard), this is an after-event remedy, easily causing frame freezing or a temporary network disconnection when the user accesses a network by using the electronic device, and reducing user experience.

It should be noted that, in embodiments of this application, the first communications module and the second communications module may be communications modules included in the electronic device. For example, the first communications module is a first Wi-Fi module, and the second communications module is a second Wi-Fi module. The first communications module and the second communications module may alternatively be connected to the electronic device through a specific interface. For example, the first communications module is a first SIM card module, and the second communications module is a second SIM card module. Alternatively, the first communications module and the second communications module are connected to the electronic device in different manners. For example, the first communications module is a SIM card, and the second communications module is a Wi-Fi module.

In view of this, an embodiment of this application provides a network handover method, so that when an electronic device camps on a first network to provide a network access service for a user, the electronic device can predict whether the first network becomes abnormal after a first duration, and when the electronic device predicts that the first network becomes abnormal, the electronic device camps on a second network in advance to provide a network access service for the user, to help reduce a possibility that frame freezing or a drop from a network occurs when the user accesses a network by using the electronic device, and help improve user experience to some extent.

For example, the electronic device in the embodiments of this application may be a mobile phone, a tablet computer, a wearable device, a vehicle-mounted device, an augmented reality (AR) device/a virtual reality (VR) device, a notebook computer, an ultra-mobile personal computer (UMPC), a netbook, a personal digital assistant (PDA), or the like. A specific type of the electronic device is not limited in the embodiments of this application.

For example, FIG. 1 is a schematic diagram of a structure of an electronic device according to an embodiment of this application. Specifically, as shown in the figure, the electronic device includes a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure shown in embodiments of this application does not constitute a specific limitation on the electronic device. In some other embodiments of this application, the electronic device may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (AP), a modem, a graphics processing unit (GPU), an image signal processor (ISP), a controller, a video codec, a digital signal processor (DSP), a baseband processor, a neural-network processing unit (NPU), and/or the like. Different processing units may be independent components, or two or more different processing units may be integrated into one component.

The controller may be a nerve center and a command center of the electronic device. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, and/or a universal serial bus (USB) interface, or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call through a Bluetooth headset. Both the I2S interface and the PCM interface may be configured to perform the audio communication.

The UART interface is a universal serial data bus, and is used to perform asynchronous communication. The bus may be a two-way communications bus. The bus converts to-be-transmitted data between serial communication and parallel communication. In some embodiments, the UART interface is usually used to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through the Bluetooth headset.

The MIPI interface may be configured to connect the processor 110 to a peripheral component such as the display 194 or the camera 193. The MIPI interface includes a camera serial interface (CSI), a display serial interface (DSI), or the like. In some embodiments, the processor 110 communicates with the camera 193 through the CSI interface, to implement a photographing function of the electronic device. The processor 110 communicates with the display 194 through the DSI interface, to implement a display function of the electronic device.

The GPIO interface may be configured by using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, or the like. The GPIO interface may be further configured as the I2C interface, the I2S interface, the UART interface, the MIPI interface, or the like.

The USB interface 130 is an interface that conforms to a USB standard specification, and may be specifically a mini USB interface, a micro USB interface, a USB type-C interface, or the like. The USB interface 130 may be configured to connect to a charger to charge the electronic device, or may be configured to transmit data between the electronic device and a peripheral device, or may be configured to connect to a headset, to play audio through the headset. The interface may be further configured to connect to another electronic device such as an AR device.

It may be understood that, an interface connection relationship between the modules shown in embodiments of this application is merely an example for description, and does not constitute a limitation on the structure of the electronic device. In some other embodiments of this application, the electronic device may alternatively use an interface connection manner different from that in the foregoing embodiment, or a combination of a plurality of interface connection manners.

The charging management module 140 is configured to receive charging input from a charger. The charger may be a wireless charger or a wired charger. In some embodiments of wired charging, the charging management module 140 may receive charging input from the wired charger through the USB interface 130. In some embodiments of wireless charging, the charging management module 140 may receive wireless charging input through a wireless charging coil of the electronic device. The charging management module 140 may further supply power to the electronic device through the power management module 141 while charging the battery 142.

The power management module 141 is configured to connect to the battery 142, the charging management module 140, and the processor 110. The power management module 141 receives input of the battery 142 and/or the charging management module 140, and supplies power to the processor 110, the internal memory 121, an external memory, the display 194, the camera 193, the wireless communications module 160, and the like. The power management module 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device may be implemented through the antenna 1, the antenna 2, the mobile communications module 150, the wireless communications module 160, the modem, the baseband processor, and the like.

The antenna 1 and the antenna 2 are configured to transmit and receive electromagnetic wave signals. Each antenna of the electronic device may be configured to cover one or more communication frequency bands. Different antennas may be further multiplexed to improve antenna utilization. For example, the antenna 1 may be multiplexed as a diversity antenna in a wireless local area network. In some other embodiments, an antenna may be used in combination with a tuning switch.

The mobile communications module 150 may provide a solution that is applied to the electronic device and that is for wireless communication including formats such as 2G/3G/4G/5G. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit the electromagnetic wave to the modem for demodulation. The mobile communications module 150 may further amplify a signal modulated by the modem, and convert an amplified signal into an electromagnetic wave through the antenna 1 for radiation. In some embodiments, at least some functional modules of the mobile communications module 150 may be disposed in the processor 110. In some embodiments, at least some functional modules of the mobile communications module 150 may be disposed in the same device as at least some modules of the processor 110.

The modem may include a modulator and a demodulator. The modulator is configured to modulate a to-be-sent low-frequency baseband signal into a medium-frequency or high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal through an audio device (which is not limited to the speaker 170A, the receiver 170B, or the like), or displays an image or a video through the display 194. In some embodiments, the modem may be an independent component. In some other embodiments, the modem may be independent of the processor 110, and is disposed in a same device as the mobile communications module 150 or another functional module.

The wireless communications module 160 includes a Wi-Fi module, and may provide a wireless communication solution that includes a wireless local area network (WLAN) (for example, a Wi-Fi network) and that is applied to the electronic device. For example, the Wi-Fi module includes a first Wi-Fi module and a second Wi-Fi module. For example, the first Wi-Fi module is configured to access a Wi-Fi network of 2.4 GHz, and the second Wi-Fi module is configured to access a Wi-Fi network of 5 GHz. In some other embodiments, the wireless communications module 160 may further provide a wireless communication solution that includes Bluetooth (BT), a global navigation satellite system (GNSS), frequency modulation (FM), near field communication (NFC), or an infrared (IR) technology and that is applied to the electronic device. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device, the antenna 1 and the mobile communications module 150 are coupled, and the antenna 2 and the wireless communications module 160 are coupled, so that the electronic device can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a Beidou navigation satellite system (BDS), a quasi-zenith satellite system (QZSS), and/or a satellite based augmentation system (SBAS).

The electronic device implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs, which execute program instructions to generate or change display information.

The display 194 is configured to display an image, a video, and the like. The display 194 includes a display panel. The display panel may use a liquid crystal display (LCD), an organic light-emitting diode (OLED), an active-matrix organic light-emitting diode (AMOLED), a flexible light-emitting diode (FLED), a mini LED, a micro LED, a micro OLED, a quantum dot light-emitting diode (QLED), or the like. In some embodiments, the electronic device may include one or N displays 194, where N is a positive integer greater than 1.

The electronic device can implement a photographing function by using the ISP, the camera 193, the video codec, the GPU, the display 194, the application processor, and the like.

The ISP is configured to process data fed back by the camera 193. For example, during photographing, a shutter is pressed, a ray of light is transmitted to a photosensitive element of the camera through a lens, and an optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to a DSP for processing. The DSP converts the digital image signal into an image signal of a standard format such as RGB or YUV. In some embodiments, the electronic device may include one or N cameras 193, where N is a positive integer greater than 1.

The digital signal processor is configured to process a digital signal. In addition to the digital image signal, the digital signal processor may further process another digital signal. For example, when the electronic device selects a frequency, the digital signal processor is configured to perform Fourier transform and the like on frequency energy.

The video codec is configured to compress or decompress a digital video. The electronic device may support one or more types of video codecs. In this way, the electronic device can play or record videos in a plurality of encoding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a transfer mode between human brain neurons, and may further continuously perform self-learning. Applications such as intelligent cognition of the electronic device, for example, image recognition, facial recognition, speech recognition, and text understanding, can be implemented by using the NPU.

The external memory interface 120 may be configured to connect to an external storage card, for example, a micro SD card, to extend a storage capability of the electronic device. The external memory card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121 to perform various function applications of the electronic device and data processing. The internal memory 121 may include a program storage area and a data storage area. The program storage area may store an operating system, an application required by at least one function (for example, a sound playing function or an image playing function), and the like. The data storage area may store data (such as audio data and a phone book) and the like created when the electronic device is used. In addition, the internal memory 121 may include a high-speed random access memory, and may further include a nonvolatile memory, for example, at least one magnetic disk storage device, a flash memory device, or a universal flash storage (UFS).

The electronic device may implement an audio function by using the audio module 170, the speaker 170A, the receiver 170B, the microphone 170C, the headset jack 170D, the application processor, and the like, for example, implement a music playback function and a recording function.

The audio module 170 is configured to convert digital audio information into an analog audio signal output, and is further configured to convert an analog audio input into a digital audio signal. The audio module 170 may further be configured to code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device may be used to listen to music or answer a hands-free call by using the speaker 170A.

The receiver 170B, also referred to as an "earpiece", is configured to convert an audio electrical signal into a sound signal. When a call is answered or voice information is received by using the electronic device, the receiver 170B may be put close to a human ear to receive a voice.

The microphone 170C, also referred to as a "mike" or a "mic", is configured to convert a sound signal into an electrical signal. When making a call or sending a voice message, a user may make a sound near the microphone 170C through the mouth of the user, to input the sound signal to the microphone 170C. At least one microphone 170C may be disposed in the electronic device. In some other embodiments, two microphones 170C may be disposed in the electronic device, to implement a noise reduction function, in addition to collecting a sound signal. In some other embodiments, three, four, or more microphones 170C may alternatively be disposed in the electronic device, to collect a sound signal and reduce noise. The microphones may further identify a sound source, to implement a directional recording function, and the like.

The headset jack 170D is configured to connect to a wired headset. The headset jack 170D may be the USB interface 130, or may be a 3.5-mm open mobile terminal platform (OMTP) standard interface, or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device determines pressure intensity based on a change of the capacitance. When a touch operation is performed on the display 194, the electronic device detects intensity of the touch operation by using the pressure sensor 180A. The electronic device may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an application icon "Messages", an instruction for viewing an SMS message is executed. When a touch operation whose touch operation intensity is greater than or equal to the first pressure threshold is performed on an application icon "Messages", an instruction for creating an SMS message is executed.

The gyro sensor 180B may be configured to determine a motion posture of the electronic device. In some embodiments, an angular velocity of the electronic device around three axes (namely, axes x, y, and z) may be determined by using the gyro sensor 180B. The gyro sensor 180B may be configured to implement image stabilization during photographing. For example, when the shutter is pressed, the gyro sensor 180B detects an angle at which the electronic device shakes, and calculates, based on the angle, a distance for which a lens module needs to compensate, so that the lens cancels the shake of the electronic device through reverse motion, to implement image stabilization. The gyro sensor 180B may be further used in a navigation scenario and a motion-sensing game scenario.

The barometric pressure sensor 180C is configured to measure barometric pressure. In some embodiments, the electronic device calculates a sea level height based on the barometric pressure measured by the barometric pressure sensor 180C, to assist in positioning and navigation.

The magnetic sensor 180D includes a Hall effect sensor. The electronic device may detect opening and closing of a flip cover by using the magnetic sensor 180D. In some embodiments, when the electronic device is a clamshell phone, the electronic device may detect opening and closing of a flip cover by using the magnetic sensor 180D. Further, a feature such as automatic unlocking upon opening of the flip cover is set based on a detected opening or closing state of the leather case or a detected opening or closing state of the flip cover.

The acceleration sensor 180E may detect accelerations in various directions (usually on three axes) of the electronic device, and may detect magnitude and a direction of gravity when the electronic device is still. The acceleration sensor may be further configured to recognize a posture of the electronic device, and is used in screen switching between a landscape mode and a portrait mode, a pedometer, or another application.

The distance sensor 180F is configured to measure a distance. The electronic device may measure the distance in an infrared or a laser manner. In some embodiments, in a photographing scenario, the electronic device may measure a distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The electronic device emits infrared light by using the light-emitting diode. The electronic device detects infrared reflected light from a nearby object by using the photodiode. When sufficient reflected light is detected, it may be determined that there is an object near the electronic device. When insufficient reflected light is detected, the electronic device may determine that there is no object near the electronic device. The electronic device may detect, by using the optical proximity sensor 180G, that the user holds the electronic device close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device is in a pocket, to prevent an accidental touch.

The fingerprint sensor 180H is configured to collect a fingerprint. The electronic device may implement fingerprint-based unlocking, application access locking, fingerprint-based photographing, fingerprint-based call answering, and the like by using a feature of the collected fingerprint.

The temperature sensor 180J is configured to detect a temperature. In some embodiments, the electronic device executes a temperature processing policy based on the temperature detected by the temperature sensor 180J. For example, when the temperature reported by the temperature sensor 180J exceeds a threshold, the electronic device degrades performance of a processor near the temperature sensor 180J, to reduce power consumption and implement thermal protection. In some other embodiments, when the temperature is lower than another threshold, the electronic device heats up the battery 142, to avoid abnormal shutdown of the electronic device due to a low temperature. In some other embodiments, when the temperature is lower than still another threshold, the electronic device boosts an output voltage of the battery 142 to avoid abnormal shutdown due to a low temperature.

The touch sensor 180K is also referred to as a "touch panel". The touch sensor 180K may be disposed in the display 194, and the touch sensor 180K and the display 194 form a touchscreen, which is also referred to as a "touch control screen". The touch sensor 180K is configured to detect a touch operation performed on or near the touch sensor 180K. The touch sensor may transfer the detected touch operation to the application processor, to determine a type of a touch event. Visual output related to the touch operation may be provided on the display 194. In some other embodiments, the touch sensor 180K may alternatively be disposed on a surface of the electronic device, and is located at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal. In some embodiments, the bone conduction sensor 180M may alternatively be disposed in a headset to form a bone conduction headset. The audio module 170 may obtain a voice signal through parsing based on the vibration signal of the vibration bone of the vocal-cord part obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device may receive a button input, and generate a button signal input related to a user setting and function control of the electronic device.

The motor 191 may generate a vibration prompt. The motor 191 may be used for an incoming call vibration prompt, or may be used for a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display 194. Different application scenarios (for example, time reminding, information receiving, an alarm clock, and a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is used to connect to a SIM card. The SIM card may be inserted into the SIM card interface 195 or detached from the SIM card interface 195, to implement contact with or separation from the electronic device. The electronic device may support one or N SIM card interfaces, where N is a positive integer greater than 1. The SIM card interface 195 can support a nano-SIM card, a micro-SIM card, a SIM card, and the like. A plurality of cards may be inserted into the same SIM card interface 195 at the same time. The plurality of cards may be of a same type or of different types. The SIM card interface 195 is applicable to different types of SIM cards. The SIM card interface 195 is also applicable to an external storage card. The electronic device interacts with a network through the SIM card, to implement functions such as calling and data communications. In some embodiments, the electronic device uses an eSIM, namely, an embedded SIM card. The eSIM card may be embedded in the electronic device, and cannot be separated from the electronic device.

Figure 2:
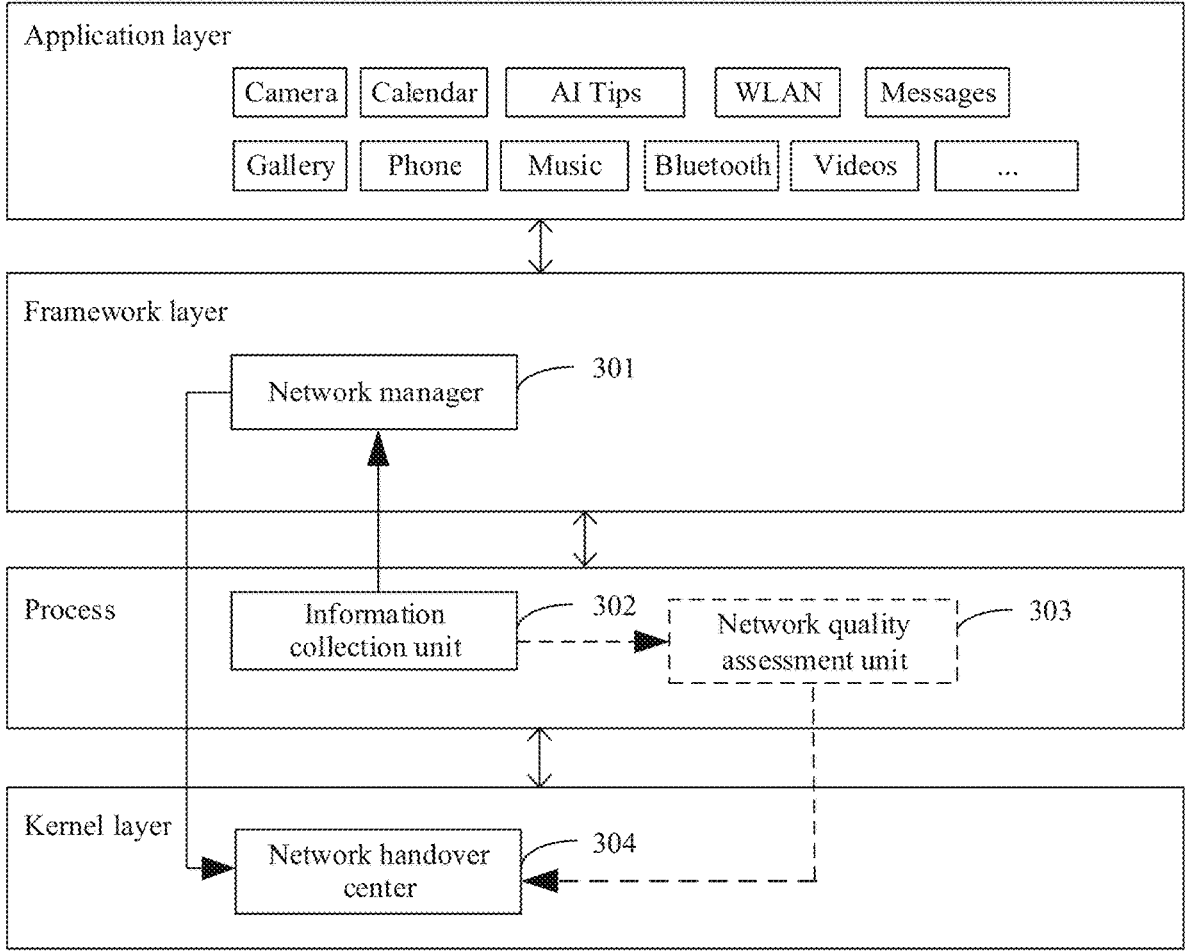
FIG. 2 is a schematic diagram of a software structure of an electronic device according to an embodiment of this application.

A hierarchical architecture, an event driven architecture, a microkernel architecture, a microservice architecture, or a cloud architecture may be used for a software system of the electrical device in embodiments of this application. The hierarchical architecture is used as an example. A software architecture of the electronic device includes several layers, and each layer has a clear role and task. The layers communicate with each other through a software interface. For example, FIG. 2 shows a software architecture of an electronic device according to an embodiment of this application. As shown in FIG. 2, a software system of the electronic device is divided into four layers, and are respectively an application layer, a framework layer, a daemon, and a kernel layer from top to bottom.

The application layer provides an application programming interface (API) and a programming framework for an application at the application layer. There may be a series of applications such as Camera, Gallery, Calendar, Phone, WLAN (for example, Wi-Fi), AI Tips, Bluetooth, Music, Videos, and Messages.

The framework layer is configured to support running of an application at the application layer, and provide a plurality of services for the application at the application layer. For example, the frame layer may include a window manager, a content provider, a view system, a phone manager, a resource manager, a notification manager, a network manager 301, or the like.

For example, the window manager is configured to manage a window program. The window manager may obtain a size of a display, determine whether there is a status bar, perform screen locking, take a screenshot, and the like. The content provider is configured to: store and obtain data, and enable the data to be accessed by an application. The data may include a video, an image, audio, calls that are made and received, a browsing history, a bookmark, an address book, and the like. The view system includes visual controls, such as a control for displaying a text and a control for displaying an image. The view system may be configured to construct an application. A display interface may include one or more views. For example, a display interface including a message notification icon may include a text display view and an image display view. The resource manager provides various resources for an application, such as a localized character string, an icon, an image, a layout file, and a video file. The notification manager enables an application to display notification information in the status bar, and may be configured to convey a notification message. The notification manager may automatically disappear after a short pause without requiring a user interaction. For example, the notification manager is configured to provide notifications of download completing, a message prompt, and the like. The notification manager may be a notification that appears in a top status bar of the system in a form of a graph or a scroll bar text, for example, a notification of an application running on the background, or may be a notification that appears on the screen in a form of a dialog window. For example, text information is prompted in the status bar, a prompt tone is produced, the electronic device vibrates, or the indicator light blinks.

The network manager 301 is configured to: when the electronic device camps on a first network, after network information of a second sampling point is obtained, predict, based on the network information of a first sampling point, the network information of the second sampling point, and a first historical sampling record, whether the first network becomes abnormal after the first duration.

The first network is accessed by using a first communications module. The network information of the first sampling point and the network information of the second sampling point are sequentially obtained by the electronic device in a process in which the electronic device moves along a first route at an $n^{th}$ time. The first historical sampling record includes network information of sampling points obtained by the electronic device for the first network in a process in which the electronic device moves along the first route at one or more times before the $n^{th}$ time. Herein, n is a positive integer greater than 1. The first route is a route between a first location and a second location.

When predicting that the first network becomes abnormal after the first duration, the network manager 301 is further configured to send first information to the kernel layer. For example, the first information may be a first handover instruction, or the first information includes related network information (for example, the probability that the first network becomes abnormal after the first duration, the probability that a second network becomes abnormal after the first duration, or a dual-card proportional packet sending indication, where the second network may be accessed by using a second communications module), so that the kernel layer further determines whether to perform a network handover. The first handover instruction is used to indicate the electronic device to camp on the second network.

Further, when the electronic device camps on the second network, the network manager 301 is further configured to detect whether the first network is recovered to normal (for example, the network manager 301 detects whether a network signal strength of the first network is greater than or equal to a specific threshold and/or whether a network standard of the first network is a specific network standard, to determine whether the first network is recovered to normal). In addition, after the electronic device camps on the second network in the process in which the electronic device moves along the first route at the $n^{th}$ time, the network manager 301 detects that the first network is recovered to normal, and sends second information to the kernel layer. The second information may be a second handover instruction, or the second information includes related information of the first network (for example, the probability that the first network becomes abnormal), so that the kernel layer further determines whether the first network is recovered to normal. The second handover instruction is used to indicate the electronic device to camp on the first network.

In addition, in some other embodiments, the network manager 301 is further configured to collect, based on network information of the first network and/or the second network collected in a process in which the electronic device moves along the first route, and that is reported by the process, statistics about the probability that the first network becomes abnormal and/or the second network at different sampling points on the first route.

Network information of a sampling point for the first network is used as an example. When the first communications module is a first SIM card, the network information may include a serving cell identifier, a network signal strength of a serving cell, a network standard, a neighboring cell identifier, a network signal strength of a neighboring cell, a system time, or the like. When the first communications module is a first Wi-Fi module, the network information may include a first Wi-Fi identifier, a network signal strength of the first network, a second Wi-Fi identifier, a network signal strength of a network identified by the second Wi-Fi identifier, a system time, or the like. The first Wi-Fi identifier is used to identify the first network. The second Wi-Fi identifier is used to identify a Wi-Fi network that exists around the first network. For example, a Wi-Fi identifier may be a Wi-Fi network name and/or a media access control (MAC) address.

It should be noted that the first duration may be 10 s, 15 s, 5 s, or the like, and may be preset before delivery of the electronic device, or may be determined by the electronic device based on an algorithm or a policy. This is not limited.

In addition, it should be further noted that, that the electronic device moves along the first route in some embodiments of this application may be understood as that the electronic device is movable, or the electronic device is carried on transportation (for example, a vehicle) or a user and moves along the first route.

The daemon is responsible for collecting network information. For example, the process includes an information collection unit 302. The information collection unit 302 may be configured to: in the process in which the electronic device moves along the first route, obtain network information of different sampling points for the first network and/or the second network from a modem and/or a Wi-Fi module every second duration, or every a specific distance, or in real time, and report the network information to the network manager 301, or the like.

In some other embodiments, the process further includes network quality assessment unit 303. The network quality assessment unit 303 is configured to: perform quality assessment on the first network and the second network, to obtain a quality assessment result, and send the quality assessment result to the kernel layer. For example, the network quality assessment unit 303 may perform quality assessment on the first network and the second network through packet feature extraction, flow feature identification, or the like (for example, when the first network or the second network is used, whether page loading becomes slow, or whether a game freezes).

It should be noted that the network quality assessment unit 303 in some embodiments of this application may alternatively be located at the framework layer. In addition, when the software architecture of the electronic device is an Android system architecture, the process may be located in Android runtime and a system library, or may be located between the framework layer and one of the Android runtime and the system library. Alternatively, some processes are located between the Android operating time and the system library, and some processes are located between the framework layer and one of the Android runtime and the system library. This is not limited.

The kernel layer is a layer between hardware and software. The kernel layer includes at least a display driver, a camera driver, an audio driver, and a sensor driver. In addition, in some embodiments of this application, the kernel layer further includes a network handover center 304. For example, the network handover center 304 is configured to perform a network handover. For example, the network handover center 304 is configured to: perform a handover to the second network after the first information from the network manager 301 is received; or perform a handover to the first network after the second information from the network manager 301 is received. For another example, the network handover center 304 is configured to: after the first information from the network manager 301 is received, determine, based on the first information or based on the first information and the quality assessment result from the network quality assessment unit 303, to perform a network handover, and then perform a handover to the second network; or after the second information from the network manager 301 is received, determine, based on the second information, to perform a network handover, and then perform a handover to the first network.

In the following embodiment, a mobile phone having the structures shown in FIG. 1 and FIG. 2 is used as an example to describe in detail the network handover method in embodiments of this application.

For example, FIG. 3 is a schematic flowchart of a network handover method according to an embodiment of this application. The method specifically includes the following steps.

Step 301: When a mobile phone camps on a first network, the mobile phone obtains network information of a sampling point every second duration in a process in which the mobile phone moves along a first route at an $n^{th}$ time. The first network is accessed by using a first communications module. Herein, n is a positive integer greater than 1.

For example, a value of n may be greater than or equal to M. In other words, the mobile phone performs the network handover method in some embodiments of this application only in a process in which the mobile phone moves along the first route at an $M^{th}$ time or after an $M^{th}$ time. It should be noted that a value of M may be predefined, may be set by a user based on a requirement of the user, or may be determined by the mobile phone based on an algorithm or a policy. A manner of determining M is not limited in the embodiments of this application. For example, a minimum value of M is 2, or may be 5, 6, 7, 8, 9, or the like. This is not limited.

The first route is a route between a first location and a second location. A physical location corresponding to the sampling point is a location between the first location and the second location on the first route. For example, the first communications module is a first SIM card, and there is network information of a sampling point 0. The network information of the sampling point 0 includes a serving cell identifier, a network signal strength of a serving cell, N neighboring cell identifiers, network signal strengths of N neighboring cells, and a system time. Specifically, the serving cell identifier is used to indicate a cell that provides a service for the mobile phone at the sampling point 0, and the N neighboring cell identifiers are respectively used to indicate cells adjacent to the cell that provides a service for the mobile phone at the sampling point 0. The network signal strength of the serving cell is used to indicate a signal strength of the serving cell measured by the mobile phone at the sampling point 0. The network signal strength of the neighboring cell is used to indicate a signal strength of the neighboring cell measured by the mobile phone at the sampling point 0. The system time is a system time of the mobile phone at the sampling point 0. For example, when the system time of the mobile phone is a Beijing time and the sampling point 0 is also the Beijing time, the system time of the mobile phone at the sampling point 0 is the sampling point 0.

For example, the second duration is 1 s, 2 s, 5 s, or the like, and may be predefined, or may be determined by the mobile phone based on an algorithm or a policy. This is not limited. For example, the mobile phone may determine the second duration based on an actual moving speed of the user. For example, a faster actual moving speed of the user indicates shorter second duration, to help improve accuracy of predicting, by the mobile phone, that the user arrives at an area in which a network abnormality occurs.

It should be noted that, in a process in which the mobile phone moves along the first route, a time interval of obtaining the network information of the sampling point may be fixed and unchanged, or may change. In other words, in a process of moving along the first route, the second duration may remain unchanged or may change. This is not limited. For example, the second duration may be a predefined fixed duration, may be a period in which the modem collects network information, or the like. The period in which the modem collects network information may change.

In some embodiments, the mobile phone may trigger, by using an event, obtaining of the network information of the sampling point every second duration. For example, when the mobile phone detects that the user leaves the first location, the mobile phone triggers obtaining of the network information of the sampling point every second duration in the process in which the mobile phone moves along the first route at the $n^{th}$ time. For example, the first location may be a location at which the user usually stays, for example, a home, a company, a dormitory, a coffee shop, a canteen, or a vegetable market. The first location may be prestored by the user in the mobile phone, or may be determined by the mobile phone based on a behavior habit of the user (for example, a Wi-Fi network frequently accessed by the user, positioning information, a used application, or information about an accessed cellular network). A manner of determining the first location is not limited in embodiments of this application. For example, the first location is a home. When a Wi-Fi function is enabled, if the mobile phone detects that the mobile phone is disconnected from a Wi-Fi network in the home in a first time period, the mobile phone may determine that the user leaves the home. For example, the first time period may be an office or school time period (for example, from 7:00 to 10:00). For another example, the mobile phone may alternatively detect, based on global positioning system (GPS) information, whether the mobile phone leaves the first location. It should be understood that, in embodiments of this application, whether the user leaves the first location may alternatively be detected in another manner. This is not limited.

Further, for example, when detecting that the user arrives at the second location, the mobile phone may stop obtaining the network information of the sampling point. The second location may be another location at which the user usually stays. For example, the first location is a home, and the second location may be a company. For another example, the first location is a company, and the second location may be a home. For still another example, the first location is a home, and the second location is a coffee shop. For yet another example, the first location is a dormitory, and the second location is a dining room. For example, the second location is a company. When a Wi-Fi function is enabled, if the mobile phone detects, in a second time period, that the mobile phone accesses a Wi-Fi network of the company, the mobile phone determines that the user arrives at the company. For example, the second time period may be an office time period. For another example, the mobile phone may also detect, based on GPS information, whether the user arrives at the company.

Specifically, in some embodiments, the mobile phone may detect, by using AI Tips at an application layer, whether the user leaves the first location, and if AI Tips detects that the user leaves the first location, AI Tips sends a network information collection instruction to an information collection unit 302. After receiving the network information collection instruction, the information collection unit 302 obtains the network information of the sampling point every second duration. In addition, the mobile phone may further detect, by using AI Tips, whether the user arrives at the second location, and if AI Tips detects that the user arrives at the second location, AI Tips sends a network information collection end (or stopping) instruction to the information collection unit 302. After receiving the network information collection end (or stopping) instruction, the information collection unit 302 stops collecting the network information.

It should be noted that the foregoing is merely an example description of an event that triggers the mobile phone to obtain or stop obtaining the network information of the sampling point every second duration, and does not constitute a limitation on the event that triggers the mobile phone to obtain or stop obtaining the network information of the sampling point every second duration in some embodiments of this application.

In some embodiments of this application, N is a positive integer greater than or equal to 0. Further, a maximum value of N does not exceed F, and a value of F may be 7, 9, 5, or the like, and may be predefined, or may be determined by the mobile phone based on an algorithm or a policy. For example, the mobile phone may determine the value of F based on an actual use of storage space. For example, when available storage space is large, the value of F may be large; or when available storage space is small, the value of F is small. For example, when the mobile phone actually collects more than F neighboring cell identifiers, a value of N may be F, and the N neighboring cell identifiers included in the network information are any F neighboring cell identifiers in a plurality of actually collected neighboring cell identifiers; or cells identified by the N neighboring cell identifiers included in the network information are cells with a high network signal strength of a plurality of cells, and the plurality of cells are cells identified by the plurality of neighboring cell identifiers actually collected by the mobile phone.

For example, if the value of F is 7. If neighboring cell identifiers actually collected by the mobile phone are respectively a cell identifier 1, a cell identifier 2, a cell identifier 3, a cell identifier 4, a cell identifier 5, a cell identifier 6, a cell identifier 7, and a cell identifier 8, and network signal strengths of cells respectively identified by the cell identifier 1 to the cell identifier 8 are in descending order, the cell identifier 1 to the cell identifier 7 and network signal strengths of cells respectively identified by the cell identifier 1 to the cell identifier 7 may be used as the N neighboring cells included in the network information and network signal strengths of the cells respectively identified by the N neighboring cell identifiers.

Figure 4:
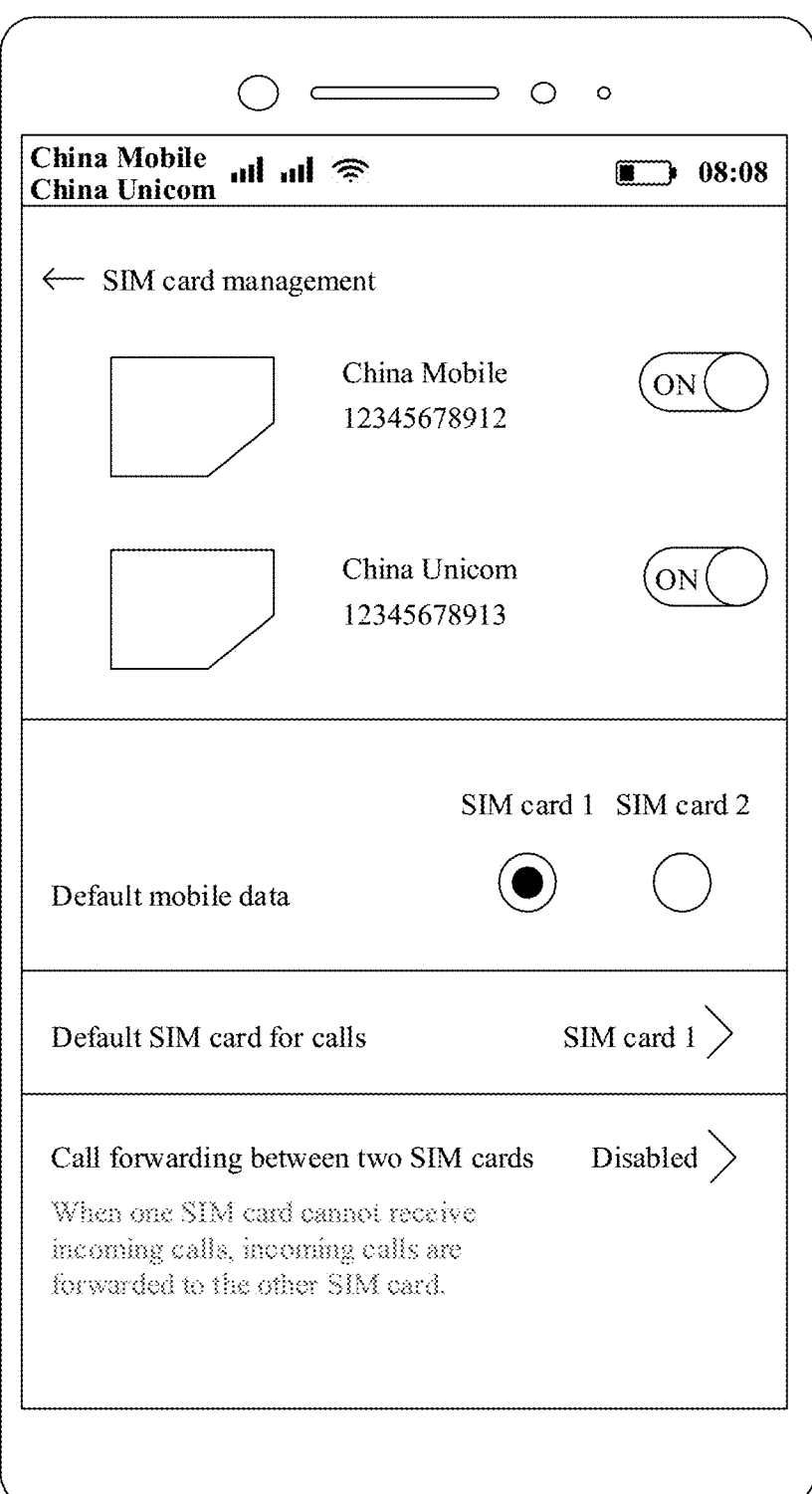
FIG. 4 is a schematic diagram of a SIM card management interface according to an embodiment of this application.

For example, the first communications module is a SIM card 1. For example, the SIM card 1 may be a SIM card used for default mobile data selected by the user. For example, the user may set, on a SIM card management interface, a SIM card used for the default mobile data. For example, the SIM card management interface is shown in FIG. 4. When the user selects a card 1, the SIM card used for the default mobile data is the card 1. For another example, the SIM card 1 may alternatively be a SIM card selected by the user for default dialing. For example, the user may set, by using the SIM card management interface shown in FIG. 4, a SIM card used for default dialing.

In particular, step 301 may be replaced with step 301'. In step 301', when the mobile phone camps on the first network, the mobile phone obtains the network information of the sampling point in real time in the process in which the mobile phone moves along the first route. Alternatively, when the mobile phone camps on the first network, the mobile phone obtains network information of sampling points at intervals in the process in which the mobile phone moves along the first route. It should be noted that a distance between two adjacent sampling points may be fixed and unchanged, or may change. This is not limited. For example, the mobile phone may determine the distance between two adjacent sampling points based on a moving speed.

Step 302: The mobile phone determines whether network information of a matching point whose relationship with network information of a sampling point obtained in the process in which the mobile phone moves along the first route at the $n^{th}$ time meets a first condition exists in a first historical sampling record.

The first historical sampling record includes one or more samples of the first route. One sample is network information obtained for the first network in a process in which the mobile phone moves along the first route before the $n^{th}$ time. Further, the first historical sampling record includes (n−1) samples. In other words, the first historical sampling record includes network information, obtained for the first network, of one or more sampling points each time before the $n^{th}$ time in a process in which the mobile phone moves along the first route.

A sample i obtained by the mobile phone for the first network in a process in which the mobile phone moves along the first route at an $(n-i)^{th}$ time is used as an example. The sample i includes network information of at least one matching point and network information of at least one abnormal point. The network information of the abnormal point is network information of a sampling point at which the probability that the first network becomes abnormal is greater than or equal to a first threshold and is obtained by the mobile phone for the first network in the process in which the mobile phone moves along the first route at the $(n-i)^{th}$ time. The network information of the matching point is network information of a sampling point at which the probability that the first network becomes abnormal is less than or equal to a second threshold and is obtained by the mobile phone for the first network in the process in which the mobile phone moves along the first route at the $(n-i)^{th}$ time. For example, the first threshold and the second threshold may be predefined, or may be determined by the mobile phone based on an algorithm or a rule. This is not limited. For example, the first threshold may be located between 0.65 and 0.95, including 0.65 and 0.95. For example, the first threshold may be 0.65, 0.95, 0.9, 0.8, or the like. For example, the second threshold may be located between 0.1 and 0.4. For example, the second threshold may be 0.2, 0.1, 0.4, or the like.

It should be noted that, for one sample, network information of one abnormal point may correspond to network information of Q matching points. Q is a positive integer greater than or equal to 2. For example, Q is 2, 3, 4, 5, 6, or the like, and may be predefined, or may be determined by the mobile phone based on an algorithm or a policy. This is not limited. In a sample, network information of different quantities of abnormal points may correspond to network information of a same quantity or different quantities of matching points.

It should be noted that, there are different serving cell identifiers and/or different network signal strengths of the serving cell in network information of different matching points corresponding to network information of the same abnormal point. For example, the difference between network signal strengths of the serving cell in network information of different matching points is not less than a specific threshold or falls within a threshold range. The threshold or the threshold range may be predefined, or may be determined by the mobile phone based on an algorithm or a rule. This is not limited.

For example, the sample i includes network information of a matching point 1, network information of a matching point 2, network information of an abnormal point 1, network information of a matching point 3, network information of a matching point 4, network information of a matching point 5, and network information of an abnormal point 2. For example, in the process in which the mobile phone moves along the first route at the $(n-i)^{th}$ time, a relationship between physical locations respectively corresponding to the matching point 1, the matching point 2, the matching point 3, the matching point 4, the matching point 5, the abnormal point 1, and the abnormal point 2 is shown in FIG. 5. In the process in which the mobile phone moves along the first route at the $(n-i)^{th}$ time, the mobile phone sequentially passes through the physical locations corresponding to the matching point 1, the matching point 2, the abnormal point 1, the matching point 3, the matching point 4, an abnormal point 5, and the abnormal point 2. Network information of a matching point corresponding to network information of the abnormal point 1 is network information of the matching point 1 and network information of the matching point 2, and network information of a matching point corresponding to network information of the abnormal point 2 is network information of the matching point 3, network information of the matching point 4, and network information of the matching point 5. For example, there are different serving cell identifiers and/or different network signal strengths of the serving cell in the network information of the matching point 1 and the network information of the matching point 2.

The first condition is used to indicate that a distance between a physical location corresponding to a sampling point in the process in which the mobile phone moves along the first route at the $n^{th}$ time and a physical location corresponding to a matching point in a process in which the mobile phone moves along the first route before the $n^{th}$ time falls within an error range. For example, when the matching point 1 in the sample i and network information of a sampling point 1 obtained in the process of moving along the first route at the $n^{th}$ time meet the first condition, a physical location corresponding to the sampling point 1 and a physical location corresponding to the matching point 1 fall within an error range.

For example, the first communications module is a first SIM card. The network information of the sampling point 1 and the network information of the matching point 1 meet the first condition. For example, in the network information of the sampling point 1 and the network information of the matching point 1, there is a same serving cell identifier, a difference between network signal strengths of the serving cell falls within a first range, there is a same neighboring cell identifier, and a difference between network signal strengths of a same neighboring cell fall within a second range. It should be noted that the first range and the second range may be the same or different. For example, the first range may be predefined, or may be determined by the mobile phone based on an algorithm or a rule. For example, the first range is [−5 dB, 5 dB], or may be [−6 dB, 6 dB], [−6 dB, 5 dB], or the like. For the second range, refer to a related description of the first range. Details are not described herein again.

In some other embodiments, when the first historical sampling record includes samples of a plurality of routes, the mobile phone may traverse the samples of the plurality of routes, and determine whether network information of a matching point whose relationship with network information of a sampling point obtained in the process of moving along the first route at the $n^{th}$ time meets the first condition exists in the first historical sampling record. Alternatively, after the mobile phone obtains network information of Y sampling points in the process in which the mobile phone moves along the first route at the $n^{th}$ time, the mobile phone may determine, based on the network information of the Y sampling points, that the mobile phone moves along the first route, and then determine whether network information of a matching point whose relationship with network information of Y+i sampling points meets the first condition exists in the samples of the first route in the first historical sampling record, where i is a positive integer greater than or equal to 1. In other words, the mobile phone determines, starting from network information of a $(Y+i)^{th}$ sampling point, whether network information of a matching point whose relationship with network information of a corresponding sampling point meets the first condition exists in the samples of the first route in the first historical sampling record. Alternatively, the mobile phone may determine, with reference to time information, whether the mobile phone moves along the first route, and then perform step 302. For example, in the office time period, after detecting that the user leaves a home, the mobile phone determines whether network information of a matching point whose relationship with network information of a corresponding sampling point meets the first condition exists in a sample of a route to work of the user in the first historical sampling record. For example, in an off-duty time period, after detecting that the user leaves a company, the mobile phone determines whether network information of a matching point whose relationship with network information of a corresponding sampling point meets the first condition exists in a sample of an off-duty route of the user in the first historical sampling record.

For example, the mobile phone determines that, in the first historical sampling record, network information of a matching point whose relationship with the network information of the sampling point 0 meets the first condition is the network information of the matching point 1, and the first communications module is a first SIM card. A signal strength error between the matching point 1 and the sampling point 0 satisfies Expression 1 or Expression 2:

$$\mathrm{Var} = C_S V_S^2 + C_N \sum_{i=1}^{j} V_{Ni}^2 \qquad 1$$

$$\mathrm{Var} = C_S |V_S| + C_N \sum_{i=1}^{j} |V_{Ni}| \qquad 2$$

Herein, $C_S$ is an error impact factor of the serving cell, $C_N$ is an error impact factor of the neighboring cell, $V_S = P_{S1} - P_{S0}$, $P_{S1}$ is a network signal strength of the serving cell in the network information of the sampling point 0, $P_{S0}$ is a network signal strength of the serving cell in the network information of the matching point 1, j is a quantity of same neighboring cell identifiers in the network information of the sampling point 0 and the network information of the matching point 1, $V_{Ni} = P_{Ni} - P_{N0i}$, $P_{Ni}$ is a network signal strength of a neighboring cell i at the sampling point 0, and $P_{Ni}$ is a network signal strength of the neighboring cell i in the network information of the matching point 1. The neighboring cell i is a cell identified by an $i^{th}$ same neighboring cell identifier in the network information of the sampling point 0 and the network information of the matching point 1.

For example, $C_S + C_N = 1$, and $C_S$ and $C_N$ may be predefined, or may be determined by the mobile phone based on an algorithm or a policy. This is not limited. For example, value ranges $C_S$ and $C_N$ are from 0 to 1. For example, $C_S = 0.3$, and $C_N = 0.7$.

Step 303: After the mobile phone sequentially obtains network information of a first sampling point and network information of a second sampling point in a process in which the mobile phone moves along the first route at the $n^{th}$ time, the mobile phone predicts, based on the network information of the first sampling point, the network information of the second sampling point, network information of a first matching point, and network information of a second matching point, whether a network abnormality occurs in the first network after a first duration; and if no network abnormality occurs in the first network after the first duration, the mobile phone continues to camp on the first network; or if a network abnormality occurs in the first network after the first duration, the mobile phone performs step 304. It should be noted that, that the mobile phone continues to camp on the first network may be understood as that the mobile phone continues to use the first network to provide a network access service for the user.

For example, the first duration may be located within a range of 5 s to 15 s. For example, the first duration may be 10 s, or may be 15 s, 5 s, or the like. This is not limited. The first duration may be predefined, may be determined with reference to a device processing speed of the mobile phone, or is determined in another manner. This is not limited.

For example, when network information of a plurality of matching points whose relationship with the network information of the first sampling point meets the first condition exists in the first historical sampling record, network information of a matching point corresponding to a smaller signal strength error between the matching point and the first sampling point in the network information of the plurality of matching points may be used as the network information of the first matching point. Similarly, when network information of a plurality of matching points whose relationship with the network information of the second sampling point meets the first condition exists in the first historical sampling record, network information of a matching point corresponding to a smaller signal strength error between the matching point and the second sampling point in the network information of the plurality of matching points may be used as the network information of the second matching point. Further, the network information of the first matching point and the network information of the second matching point are network information in a same sample. In other words, the network information of the first matching point and the network information of the second matching point are sequentially obtained in a process of moving along the first route at one time (for example, the $(n-i)^{th}$ time) before the $n^{th}$ time. This helps improve reliability of predicting whether the first network becomes abnormal after the first duration.

In some embodiments, the mobile phone may determine, based on system times in the network information of the first sampling point, the network information of the second sampling point, the network information of the first matching point, the network information of the second matching point, and network information of a first abnormal point, that the first network becomes abnormal after third duration. Then, the mobile phone determines whether the third duration is greater than the first duration. When the third duration is less than or equal to the first duration, the mobile phone predicts that the first network becomes abnormal after the first duration; or when the third duration is greater than the first duration, the mobile phone predicts that the first network does not become abnormal after the first duration. The network information of the first abnormal point is network information of an abnormal point corresponding to the network information of the first matching point and the network information of the second matching point.

For example, the system times in the network information of the first sampling point, the network information of the second sampling point, the network information of the first matching point, the network information of the second matching point, and the network information of the first abnormal point are respectively a moment Ti, a moment Tj, a moment T1, a moment T2, and a moment T3. The moment Tj is after the moment Ti, the moment T3 is after the moment T2, the moment T2 is after the moment T1, and the third duration $t1 = (Tj-Ti)(T3-T2)/(T2-T1)$.

Further, when the third duration is greater than the first duration, the mobile phone starts a timer to start timing, and performs step 304 after timing of the timer ends. Timing duration of the timer is fourth duration, and the fourth duration is a difference between the third duration and the first duration. In other words, for the mobile phone, the fourth duration is from the moment Tj to a moment at which timing of the timer ends. Therefore, for the mobile phone, the first network becomes abnormal after the third duration.

It can be understood that, the timing duration of the timer is duration from a start of timing to an end of timing.

Alternatively, when the third duration is greater than the first duration, the mobile phone starts a timer to start timing, continues to obtain network information of a sampling point every second duration in the process in which the mobile phone moves along the first route at the $n^{th}$ time, and then performs step 302 to continue to predict a period of time after which the first network becomes abnormal for the mobile phone. Further, whether to update the timing duration of the timer may be determined based on a principle that there is a smallest time error. For example, the mobile phone predicts, based on the network information of the first matching point and the network information of the second matching point, that the first network becomes abnormal after the third duration, and when the third duration is greater than the first duration, the mobile phone sets the timing duration of the timer to the fourth duration. The fourth duration is a difference between the third duration and the first duration. Before timing of the timer ends, the mobile phone further sequentially obtains network information of a third sampling point and network information of a fourth sampling point in the process in which the mobile phone moves along the first route at the $n^{th}$ time. The network information of the third sampling point and network information of a third matching point in the first historical sampling record meet a first condition, and the network information of the fourth sampling point and network information of a fourth matching point in the first historical sampling record meet the first condition, and the network information of the third matching point and the network information of the fourth matching point are network information of a sampling point at which the probability that a network abnormality occurs in the first network is less than or equal to the second threshold and is obtained for the first network in a process in which the mobile phone moves along the first route before the $n^{th}$ time. It should be noted that, the network information of the third matching point, the network information of the fourth matching point, the network information of the first matching point, and the network information of the second matching point may belong to one sample, or may belong to different samples. If the mobile phone predicts, based on the network information of the third matching point and the network information of the fourth matching point, that the first network becomes abnormal after fifth duration, if a time error between duration predicted based on the network information of the third matching point and duration predicted based on the network information of the fourth matching point is greater than a time error of duration predicted based on the network information of the first matching point and duration predicted based on the network information of the second matching point, the timing duration of the timer is not to be updated; or if a time error between duration predicted based on the network information of the third matching point and duration predicted based on the network information of the fourth matching point is less than or equal to a time error of duration predicted based on the network information of the first matching point and duration predicted based on the network information of the second matching point, the timing duration of the timer is updated to sixth duration when timing of the timer does not end and the fifth duration is greater than the first duration. The sixth duration is a difference between the fifth duration and the first duration. By analogy, until timing of the timer ends, the timing duration of the timer is not to be updated, and step 304 is performed.

A time error between third duration predicted based on the network information of the first matching point and third duration predicted based on the network information of the second matching point is used as an example. For example, the time error between the third duration predicted based on the network information of the first matching point and the third duration predicted based on the network information of the second matching point satisfies Expression 3:

$$T_{var} = t_0 + V_1 + V_2 \qquad\qquad 3$$

Herein, $$t0 = \frac{(Tj - Ti) - (T2 - T1)}{T2 - T1},$$

$$V_1 = \frac{Var1}{P_{max}^2} * \frac{M - L1}{M}, \text{ and}$$

$$V_2 = \frac{Var2}{P_{max}^2} * \frac{M - L2}{M}.$$

Herein, $T_{var}$ is the time error between the third duration predicted based on the network information of the first matching point and the third duration predicted based on the network information of the second matching point, Ti is a system time of the mobile phone at the first sampling point, Tj is a system time of the mobile phone at the second sampling point, T1 is a system time of the mobile phone at the first matching point, T2 is a system time of the mobile phone at the second matching point, Var1 is a signal strength error between the first sampling point and the first matching point, Var2 is a signal strength error between the second sampling point and the second matching point, L1 is a quantity of same neighboring cell identifiers in the network information of the first sampling point and the network information of the first matching point, L2 is a quantity of same neighboring cell identifiers in the network information of the second sampling point and the network information of the second matching point, M is a maximum quantity of neighboring cell identifiers in network information of one sampling point, and $P_{max}$ is a maximum deviation between network signal strengths of a same cell that are collected in processes in which the user moves along the first route at different times. For example, $P_{max}$ may be 5 dB, 6 dB, or the like, and may be predefined, or may be determined by the mobile phone based on an algorithm or a policy. This is not limited.

In addition, when network information of a plurality of matching points whose relationship with the network information of the first sampling point meets the first condition exists in the first historical sampling record, and network information of a plurality of matching points whose relationship with the network information of the second sampling point meets the first condition exists in the first historical sampling record, for example, the mobile phone determines, based on a principle that there is a smallest time error, network information of a matching point used to predict whether the first network becomes abnormal after the first duration. For example, if the time error between the duration predicted based on the network information of the first matching point and the duration predicted based on the network information of the second matching point is small, the mobile phone predicts, based on the network information of the first matching point and the network information of the second matching point, whether the first network becomes abnormal after the first duration. Alternatively, the mobile phone determines, based on a principle that there is a smallest signal strength error and the principle that there is a smallest time error, network information of a matching point used to predict whether the first network becomes abnormal after the first duration. For example, when the network information of the matching point 1 and the network information of the matching point 3 in the first historical sampling record and the network information of the first sampling point meet the first condition, and the network information of the matching point 2 and the network information of the matching point 4 in the first historical sampling record and the network information of the second sampling point meet the first condition, a signal strength error between the matching point 1 and the first sampling point is less than a signal strength error between the matching point 3 and the first sampling point. When a signal strength error between the matching point 2 and the second sampling point is the same as a signal strength error between the matching point 4 and the second sampling point, if the network information of the matching point 1, the network information of the matching point 2, and the network information of the matching point 4 are network information of a same sample in the first historical sampling record, the mobile phone may determine, based on the principle that there is a smallest time error, the network information of the matching point used to predict whether the first network becomes abnormal after the first duration. For example, if a time error between duration predicted based on the network information of the matching point 1 and duration predicted based on the network information of the matching point 2 is less than a time error between duration predicted based on the network information of the matching point 1 and duration predicted based on the network information of the matching point 4, the network information of the matching point 1 is used as the network information of the first matching point, and when taken the matching point 2 as the second matching point, the network information of the matching point 2 is used to predict whether the first network becomes abnormal after the first duration.

For example, the network information of the matching point 1, the network information of the matching point 2, and the network information of the matching point 4 are obtained by the mobile phone in the process in which the mobile phone moves along the first route at the $(n-i)^{th}$ time. When the network information of the matching point 3 is obtained by the mobile phone in the process in which the mobile phone moves along the first route at the $(n-j)^{th}$ time, system times respectively corresponding to the first sampling point, the second sampling point, the matching point 1, the matching point 2, the matching point 3, and the matching point 4 are shown in FIG. 6.

Step 304: When the mobile phone predicts that the first network becomes abnormal after the first duration, before the first network becomes abnormal, the mobile phone camps on the second network accessed by using a second communications module, to provide a network access service for the user. The second communications module may be a second SIM card, may be a second Wi-Fi module, or the like.

Further, when the mobile phone predicts that the first network becomes abnormal after the first duration, the mobile phone determines whether the second network is abnormal, and camps on the second network if the second network does not become abnormal. When a network abnormality occurs in the second network, the mobile phone does not perform a network handover, and continues camping on the first network. This helps reduce a quantity of invalid network handovers.

For example, the mobile phone may determine, based on a second historical sampling record, whether the second network is abnormal. The second historical sampling record is a historical sampling record for the second network, namely, a historical sampling record for the second communications module. For example, the second historical sampling record includes one or more samples of the first route. For a sample obtaining manner in embodiments of this application, refer to FIG. 7. Details are not described herein again.

For example, if the mobile phone predicts that the first network becomes abnormal after the first duration, the mobile phone determines whether the probability that the second network corresponding to the network information of the first abnormal point in the second historical sampling record becomes abnormal is less than a second threshold, and when the probability that the second network is abnormal is less than the second threshold, the mobile phone determines that the second network does not become abnormal. For the second threshold, refer to the foregoing related descriptions. Details are not described herein again.

For another example, when the mobile phone predicts that the first network becomes abnormal after the first duration, the mobile phone may send a data packet simultaneously by using the first network and the second network, perform quality assessment on the first network and the second network, and determine, based on a quality assessment result, whether the second network is abnormal.

For example, a ratio of a quantity of data packets sent by using the first network to a quantity of data packets sent by using the second network may be P1:P2. For example, $P1:P2=(1-Y1):(1-Y2)$. Y1 is the first threshold, and Y2 is the second threshold. Specifically, the mobile phone performs quality assessment on the first network by using the data packet sent through the first network, and performs quality assessment on the second network by using the data packet sent through the second network. If the quality assessment result indicates that quality of the second network is better than quality of the first network, the mobile phone determines that the second network does not become abnormal. For example, in some embodiments of this application, network quality may be measured based on a network bandwidth, a transmission delay, a packet loss rate, a transmission rate, or the like. A smaller transmission delay, a smaller packet loss rate, a larger network bandwidth, and a faster transmission rate indicate better network quality. For example, quality assessment is performed on the first network by using the data packet sent through the first network. A flow type may be determined by performing a packet characteristic analysis on the data packet sent through the first network. The flow type may be understood as a type of a service (for example, a video or a game) currently running on the mobile phone. In addition, The transmission delay, the network bandwidth, the transmission rate, the packet loss rate, or the like may be determined by collecting flow characteristic statistics (for example, statistics about a quantity of sent packets, or statistics about hybrid automatic repeat request (HARQ) information returned for a sent packet) about the data packet sent through the first network, to determine whether frame freezing (for example, whether page loading becomes slower or whether the game freezes) occurs when the first network is used for the mobile phone.

In some embodiments, after the mobile phone camps on the second network, the mobile phone may further obtain network information of a sampling point in a process in which the mobile phone moves along the first route, and re-camp on the first network when detecting, based on the obtained network information of the sampling point, that the first network is recovered to normal, to provide a network access service for the user.

For example, the first communications module is a first SIM card. The network information of the sampling point includes the network signal strength of the serving cell. When the network signal strength of the serving cell is greater than a third threshold, the mobile phone may determine that the first network is recovered to normal. For another example, the network information of the sampling point includes the network signal strength of the serving cell and a network standard. When the network signal strength of the serving cell is greater than the fourth threshold and the network standard is a first network standard, the mobile phone may determine that the first network is recovered to normal. The third threshold and the fourth threshold may be the same or different. This is not limited. The first network standard may be a network standard set by the user based on a requirement of the user, may be a highest network standard supported by the mobile phone, or the like. This is not limited.

For example, a sample 0 is obtained in a process in which a mobile phone moves along a first route at an $(n-i)^{th}$ time, and a first communications module is a first SIM card. For example, FIG. 7 is a schematic flowchart of obtaining a sample 0 of a first SIM card according to an embodiment of this application. The following steps are specifically included.

Step 701: When the first SIM card is enabled, the mobile phone detects, at the $(n-i)^{th}$ time, that the mobile phone leaves a first location, and obtains network information of a sampling point every specific duration.

It should be noted that, an interval of obtaining the network information of the sampling point when the mobile phone obtains the sample may be the same as or different from an interval of obtaining the network information of the sampling point when whether the first network becomes abnormal is predicted after the first duration. This is not limited.

Specifically, for detection of a case in which the mobile phone leaves the first location, the network information of the sampling point, or the like, refer to a related description in FIG. 3. Details are not described herein again.

Step 702: After detecting that the mobile phone arrives at a second location, the mobile phone stops obtaining the network information of the sampling point. A route between the first location and the second location is the first route.

Specifically, for the second location, detection of the second location, or the like, refer to a corresponding description in FIG. 3. Details are not described herein again.

Step 703: The mobile phone determines a sample 0 based on the network information of the sampling point obtained in the process in which the mobile phone moves along the first route at the $(n-i)^{th}$ time, and determines, based on the probability that a network abnormality occurs in the first network corresponding to a sample obtained in the process in which the mobile phone moves along the first route before the $(n-i)^{th}$ time, the probability that a network abnormality occurs in the first network at each sampling point in the sample 0. In addition, the mobile phone further updates, based on the network information of the sampling point obtained in the process in which the mobile phone moves along the first route at the $(n-i)^{th}$ time, the probability that a network abnormality occurs in the first network of each sampling point in a sample obtained in a process in which the mobile phone moves along the first route before the $(n-i)^{th}$ time.

For example, in the process in which the mobile phone moves along the first route at the $(n-i)^{th}$ time, the probability that the first network becomes abnormal at a sampling point may be determined based on a Markov algorithm. A sampling point 1 is used as an example. For example, a serving cell identifier included in network information of the sampling point 1 is an identifier 1. The probability that the first network becomes abnormal at the sampling point 1 in the process in which the mobile phone moves along the first route at the $(n-i)^{th}$ time may be understood as follows: In the process in which the mobile phone moves along the first route at the $(n-i)^{th}$ time, when the first network is accessed by using a cell identified by the identifier 1, the probability that a network abnormality occurs in the first network may satisfy Expression 4:

$$P = \frac{E_{n-i}}{A_{n-i}} \qquad\qquad 4$$

Herein, $E_{n-i}$ is a total quantity of times that the first network becomes abnormal in the cell identified by the identifier 1 in the process in which the mobile phone moves along the first route at the $(n-i)^{th}$ time, and $A_{n-i}$ is a total quantity of times that the mobile phone obtains the identifier 1 in the process in which the mobile phone moves along the first route at the $(n-i)^{th}$ time.

For example, $n-i$ is 2. In a process in which the mobile phone moves along the first route at a first time, the mobile phone obtains network information of X sampling points, and the network information of the X sampling points is respectively network information of a sampling point 11, network information of a sampling point 12, network information of a sampling point 13, . . . , and network information of a sampling point 1x. If the first network becomes abnormal at a sampling point 16 and a sampling point 19, both the sampling point 16 and the sampling point 19 are abnormal points.

If it is specified that the mobile phone reserves network information of a maximum of four matching points for each abnormal point, the mobile phone may reserve network information of the sampling point 12 to a sampling point 15 as network information of matching points corresponding to network information of the sampling point 16, and reserve network information of a sampling point 17 and a sampling point 18 as network information of matching points corresponding to network information of the sampling point 19. Other network information may not be reserved, to avoid occupying large memory space. When the mobile phone has large storage space, network information other than network information of an abnormal point and a matching point may also be reserved. For example, a sample 1 obtained in a process in which the mobile phone moves along the first route at the first time includes network information of the sampling point 12 to the sampling point 19. Serving cell identifiers in the network information of the sampling point 12 to the sampling point 19 are respectively an identifier 2, an identifier 3, an identifier 4, an identifier 5, an identifier 6, an identifier 7, an identifier 8, and an identifier 9. The probability that a network abnormality occurs in the first network is 100% in cells identified by the identifier 5 and the identifier 9, and the probability that a network abnormality occurs in the first network is 0 in cells identified by identifiers 2 to 4, an identifier 7, and an identifier 8.

In a process in which the mobile phone moves along the first route at a second time, the mobile phone also obtains network information of X sampling points, and the network information of the X sampling points is respectively network information of a sampling point 21, network information of a sampling point 22, network information of a sampling point 23, . . . , and network information of a sampling point 2x.

If the first network becomes abnormal at a sampling point 24 and a sampling point 29, both the sampling point 24 and the sampling point 29 are abnormal points. The mobile phone may reserve the network information of the sampling point 21 to the sampling point 23 as network information of matching points corresponding to network information of the sampling point 24, and reserve network information of a sampling point 25 to a sampling point 28 as network information of matching points corresponding to network information of the sampling point 29, to obtain the sample 0. In other words, a sample 0 obtained in a process in which the mobile phone moves along the first route at the second time includes network information of the sampling point 21 to the sampling point 24 and the sampling point 25 to the sampling point 29. For example, serving cell identifiers in the network information of the sampling point 21 to the sampling point 29 are respectively an identifier 1, an identifier 2, an identifier 3, an identifier 4, an identifier 5, an identifier 6, an identifier 7, an identifier 8, and an identifier 9, and the first network becomes abnormal in cells identified by the identifier 4 and the identifier 9. Because a network abnormality occurs for a first time in the cell identified by the identifier 4 in the process of moving along the first route at the second time, the probability that the first network becomes abnormal in a cell identified by the identifier 4 is 100%, the first network becomes abnormal in a cell identified by the identifier 5 in the process of moving along the first route at the first time, and no abnormality occurs in the cell identified by the identifier 5 in the process of moving along the first route at the second time. Therefore, the probability that a network abnormality occurs in the first network in the cell identified by the identifier 5 may be updated to 50%. In addition, the first network becomes abnormal in a cell identified by the identifier 9 in the process of moving along the first route at the first time, and the first network still becomes abnormal in the cell identified by the identifier 9 in the process of moving along the first route at the second time. Therefore, the probability that a network abnormality occurs in the cell identified by the identifier 9 is still 100%.

In addition, the mobile phone may further update, based on whether the first network becomes abnormal in the cells identified by the identifier 4, the identifier 5, and the identifier 9 in a subsequent process of moving along the first route, a probability that the first network becomes abnormal in the cells identified by the identifier 4, the identifier 5, and the identifier 9.

It should be noted that, when network information of a first matching point and network information of a second matching point are used to predict whether the first network becomes abnormal after the first duration, a probability that the first network becomes abnormal is greater than or equal to a first threshold in a cell identified by a serving cell identifier in network information of an abnormal point corresponding to the network information of the first matching point and the network information of the second matching point, and the mobile phone determines that the first network becomes abnormal at a first abnormal point. In other words, in the cell identified by the serving cell identifier in network information of the first abnormal point, the first network becomes abnormal. If a probability that the first network becomes abnormal is less than a first threshold in the cell identified by the serving cell identifier in the network information of the abnormal point corresponding to the network information of the first matching point and the network information of the second matching point, the mobile phone determines that the first network does not become abnormal at the first abnormal point. In other words, the first network does not become abnormal in the cell identified by the serving cell identifier in the network information of the first abnormal point.

In some embodiments, when storage duration of a sample reaches a validity period, the mobile phone may further automatically delete the sample. This helps clear invalid data. The validity period may be one month, half a year, half a month, or the like, and may be predefined, or may be set by a user based on a requirement, or may be determined by a mobile phone based on an algorithm or a policy. This is not limited.

Alternatively, in some other embodiments, the mobile phone may update, based on network information of a sampling point collected in a process of moving along the first route last time, the probability that the first network becomes abnormal in the cell identified by a first serving cell identifier in the first historical sampling record. The cell identified by the first serving cell identifier is a cell in which a probability that the first network becomes abnormal is greater than or equal to a specific threshold (for example, 90%, 80%, or 70%, which may be predefined, or may be determined based on an algorithm, or the like) in the first historical sampling record. This helps improve data processing efficiency. Alternatively, the cell identified by the first serving cell identifier is a cell that is identified by a serving cell identifier and that corresponds to first W probabilities that are sorted in descending order and at which the first network becomes abnormal in the first historical sampling record. For example, a value of W may be 1, 2, 3, or the like. This is not limited.

It should be noted that, in some embodiments of this application, when the mobile phone has enough storage space, the mobile phone may alternatively not delete historical network information collected each time, and then determine, with reference to the historical network information, the probability that a network abnormality occurs in a cell identified by a collected cell identifier.

It should be further noted that, in some embodiments of this application, the mobile phone may further update, with reference to network information of a matching point in a sample obtained in a process in which the mobile phone moves along the first route before the $(n-i)^{th}$ time, the probability that the first network becomes abnormal in the process in which the mobile phone moves along the first route at the $(n-i)^{th}$ time. For example, a sample 1 includes network information of a matching point 1, a serving cell identifier included in the network information of the matching point 1 is an identifier 1, a sample 1 is obtained by the mobile phone in a process in which the mobile phone moves along the first route at the first time, and in a process of moving along the first route at the second time, for the mobile phone, the first network becomes abnormal in a cell identified by an identifier 1. Because the first network does not become abnormal in the cell identified by the identifier 1 in the process in which the mobile phone moves along the first route at the first time, the mobile phone determines, based on whether the first network becomes abnormal in the cell identified by the identifier 1 in the processes in which the mobile phone moves along the first route at the first time and the second time, that the probability that the first network becomes abnormal in the cell identified by the identifier 1 is 50%.

It should be understood that, the network abnormality in some embodiments of this application may include a drop from a network and/or a fall into an older or lower standard. It should be noted that, whether the mobile phone has no service or a limited service may be understood as follows: The mobile phone is dropped from a network. However, a higher network standard of the mobile phone changes to a lower network standard. For example, the network standard of the mobile phone changes from 4G to 3G, changes from 3G to 2G, changes from 5G to 4G or 3G, or the like, and it may be understood as follows: The mobile phone falls into a lower standard. However, in some embodiments of this application, the falling into a lower standard does not involve a voice call scenario. For example, if the mobile phone changes from 5G to 2G when the user makes a call by using the mobile phone, it is not considered that the mobile phone falls into a lower standard.

Figure 8:
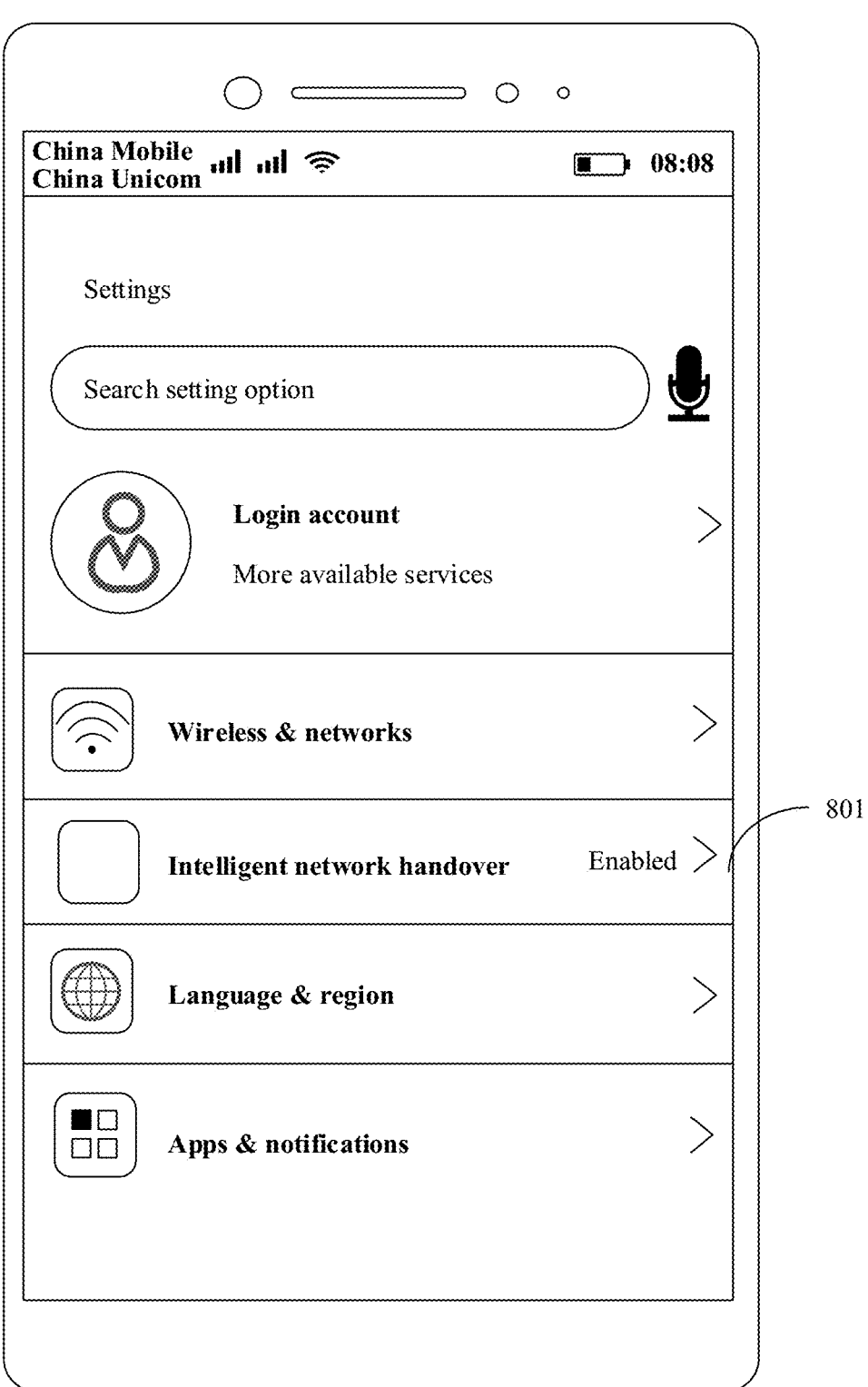
FIG. 8 is a schematic diagram of a system setting interface according to an embodiment of this application.
Figure 9:
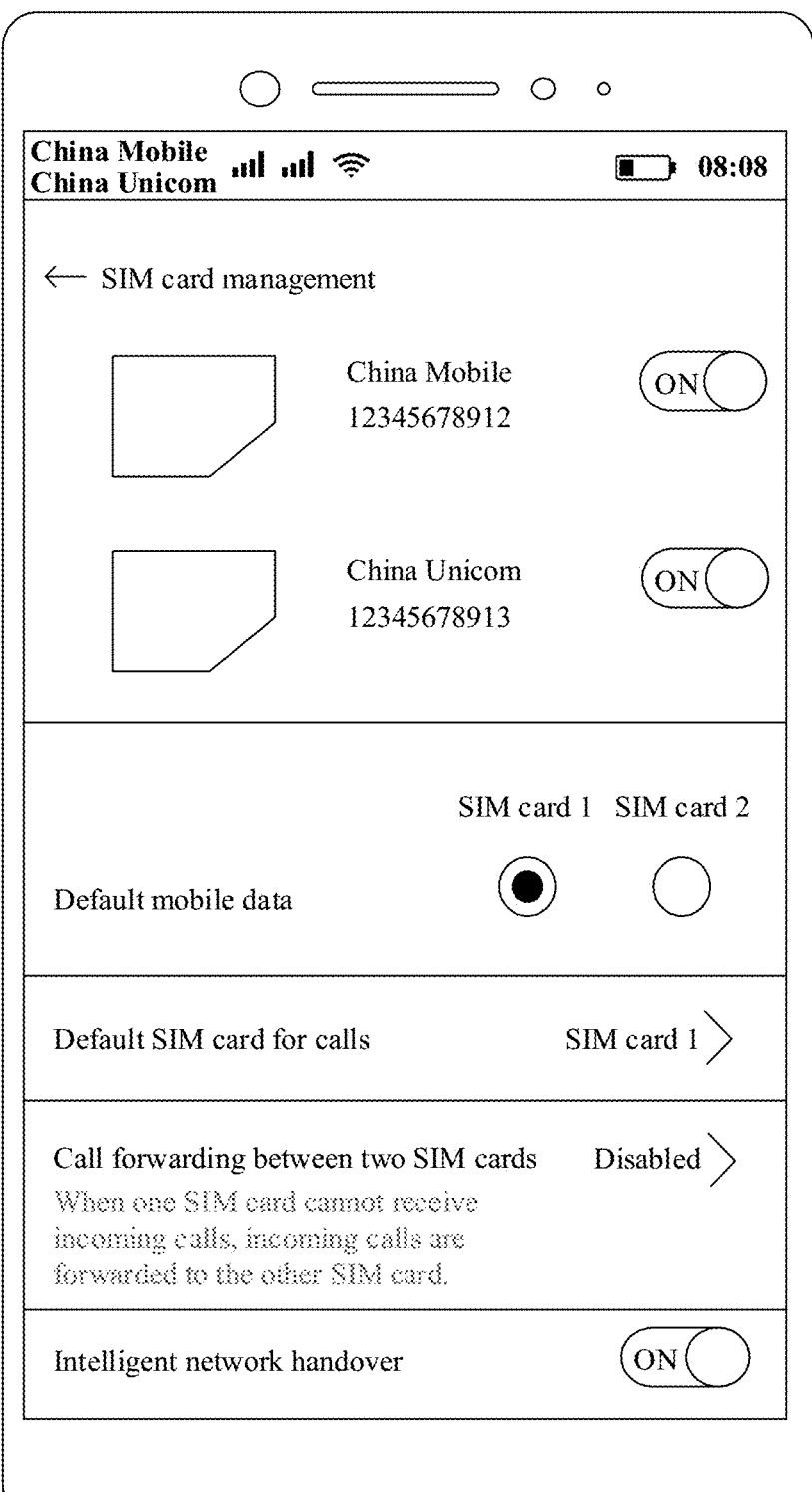
FIG. 9 is a schematic diagram of another SIM card management interface according to an embodiment of this application.

In addition, in some embodiments, when an intelligent network handover function is enabled, the mobile phone may further perform the network handover method in some embodiments of this application. This helps perform interaction between the mobile phone and the user. For example, the user may perform an operation by using a control that is in a system setting interface and that is configured to control enabling or disabling the intelligent network handover function, to enable or disable the intelligent network handover function. For example, as shown in FIG. 8, the system setting interface may include a control 801 configured to control enabling or disabling the intelligent network handover function. Alternatively, the user may set, in another interface (for example, a SIM card management interface), a control configured to control enabling or disabling the intelligent network handover function. For example, as shown in FIG. 9, the SIM card management interface may include a control configured to control enabling or disabling the intelligent network handover function.

The foregoing embodiments may be used alone, or may be used in combination with each other, to achieve different technical effects.

With reference to the foregoing embodiments and the accompanying drawings, an embodiment of this application provides a network handover method. The method may be implemented in an electronic device having the hardware structure shown in FIG. 1.

FIG. 10 is a schematic flowchart of a network handover method according to an embodiment of this application. The following steps are included.

Step 1001: When an electronic device camps on a first network accessed by using a first communications module, the electronic device sequentially obtains network information of a first sampling point and network information of a second sampling point for the first network in a process in which the electronic device moves along a first route at an $n^{th}$ time, where the first route is a route between a first location and a second location.

Step 1002: After the electronic device obtains the network information of the second sampling point, if the electronic device predicts, based on the network information of the first sampling point, the network information of the second sampling point, and a first historical sampling record, that the first network becomes abnormal after first duration when the electronic device moves along the first route at the $n^{th}$ time, in the process in which the electronic device moves along the first route at the $n^{th}$ time, before the first network becomes abnormal, the electronic device camps on a second network accessed by using a second communications module.

The first historical sampling record includes network information of sampling points obtained by the electronic device for the first network in a process in which the electronic device moves along the first route each time before the $n^{th}$ time, where n is a positive integer greater than 1.

For a specific implementation of the network handover method shown in FIG. 10, refer to a related description in the foregoing embodiments.

In embodiments provided in this application, the method provided in embodiments of this application is described from a perspective of the electronic device as an execution body. To implement functions in the methods provided in the embodiments of this application, the electronic device may include a hardware structure and/or a software module, and implement the functions in a form of the hardware structure, the software module, or a combination of the hardware structure and the software module. Whether a specific function in the foregoing functions is performed by using a hardware structure, a software module, or a combination of the hardware structure and the software module depends on a specific application and a design constraint of the technical solutions.

As shown in FIG. 11, an embodiment of this application discloses an electronic device 1100. The electronic device 1100 may include one or more processors 1101 and a memory 1102. The memory 1102 stores program instructions. The program instructions are executed by the electronic device, to implement the network handover method shown in FIG. 3 or FIG. 10 in embodiments of this application.

In some embodiments, the electronic device 1100 further includes a first communications module 1103 and a second communications module 1104. The first communications module 1103 is used to access a first network, and the second communications module 1104 is used to access a second network. In addition, the first communications module 1103 and the second communications module 1104 may alternatively not be components of the electronic device, but are communications modules connected to the electronic device through an interface or in another manner.

The processor in the foregoing embodiments may be a general-purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware decoding processor, or may be performed and completed by using a combination of hardware and software modules in the decoding processor. The software module may be located in a mature storage medium in the art, such as a random access memory (RAM), a flash memory, a read-only memory (ROM), a programmable read-only memory, an electrically erasable programmable memory, or a register. The storage medium is located in the memory, and the processor reads instructions in the memory and completes the steps in the foregoing methods in combination with hardware of the processor.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network handover method, wherein the method is implemented in an electronic device, the electronic device comprises a first subscriber identity module (SIM) card and a second SIM card, and the method comprises:

when accessing a first mobile network by using the first SIM card, obtaining network information of the first mobile network in a process in which the electronic device moves along a first route, wherein the first route is a route between a first location and a second location, and the obtaining the network information of the first mobile network in the process in which the electronic device moves along the first route occurs after accessing the first mobile network by using the first SIM card and leaving the first location; and when the electronic device predicts, according to the obtained network information of the first mobile network, that the electronic device moves along the first route and that a first exception occurs in the first mobile network, accessing, by the electronic device, a second mobile network at a third location on the first route by using the second SIM card, wherein the third location is located between the first location and the second location.

2. The method according to claim 1, wherein after the accessing, by the electronic device, the second mobile network at the third location on the first route by using the second SIM card, the method further comprises:

when determining that the first mobile network is restored to normal, the electronic device stops accessing the second mobile network by using the second SIM card at a location on the first route after the third location.

3. The method according to claim 1, wherein the accessing, by the electronic device, the second mobile network at the third location on the first route by using the second SIM card comprises:

switching, by the electronic device at the third location on the first route, from accessing the first mobile network by using the first SIM card to accessing the second mobile network by using the second SIM card; or simultaneously accessing, by the electronic device, the first mobile network by using the first SIM card and accessing the second mobile network by using the second SIM card at the third location on the first route.

4. The method according to claim 1, wherein the predicting, by the electronic device according to the obtained network information of the first mobile network, that the first exception occurs in the first mobile network when the electronic device moves along the first route comprises:

obtaining, by the electronic device, the network information of the first mobile network in the process of moving along the first route and historical network information of the first mobile network in the process of moving along the first route, and predicting that the first exception occurs in the first mobile network when the electronic device moves along the first route.

5. The method according to claim 1, wherein when the predicting that the first exception occurs in the first mobile network when the electronic device moves along the first route, the accessing, by the electronic device, the second mobile network at the third location on the first route by using the second SIM card comprises:

when the electronic device predicts that the first exception occurs in the first mobile network, determining, by the electronic device, whether a second exception occurs in the second mobile network; and when determining that no exception occurs in the second mobile network, accessing, by the electronic device, the second mobile network at the third location on the first route by using the second SIM card.

6. The method according to claim 5, wherein the determining, by the electronic device, whether a second exception occurs in the second mobile network comprises at least one of:

determining, by the electronic device based on historical network information of the second mobile network, whether the second exception occurs in the second network; or sending, by the electronic device, a data packet by using the second mobile network to determine network quality of the second mobile network, and determining, according to the network quality of the second mobile network, whether the second exception occurs in the second mobile network.

7. The method according to claim 1, wherein the method further comprises:

after the electronic device arrives at the second location, stopping obtaining the network information of the first mobile network.

8. The method according to claim 2, wherein the determining that the first mobile network is restored to normal comprises:

determining, by the electronic device, that the first mobile network performs at least one of the following: restoring a network connection from a network disconnection state, upgrading to a higher standard, unfreezing in a network, or increasing a network signal strength.

9. The method according to claim 1, wherein the first exception comprises at least one of the following: dropping from a network, falling into a lower standard, network freezing, or network signal strength decrease.

10. The method according to claim 1, wherein the method further comprises detecting that an intelligent network handover function is enabled.

11. An electronic device, comprising:

a memory storing computer executable program code; and a processor coupled to the memory;

wherein the program code executed by the processor causes the electronic device to:

when accessing a first mobile network by using the first SIM card, obtain network information of the first mobile network in a process in which the electronic device moves along a first route, wherein the first route is a route between a first location and a second location, and the obtaining the network information of the first mobile network in the process in which the electronic device moves along the first route occurs after accessing the first mobile network by using the first SIM card and leaving the first location; and when the electronic device predicts, according to the obtained network information of the first mobile network, that the electronic device moves along the first route and that a first exception occurs in the first mobile network, access, by the electronic device, a second mobile network at a third location on the first route by using the second SIM card, wherein the third location is located between the first location and the second location.

12. The electronic device according to claim 11, wherein the program code executed by the processor, further causes the electronic device to:

when determining that the first mobile network is restored to normal, stop accessing the second mobile network by using the second SIM card at a location on the first route after the third location.

13. The electronic device according to claim 12, wherein the determining that the first mobile network is restored to normal comprises:

determining, by the electronic device, that the first mobile network performs at least one of the following: restoring a network connection from a network disconnection state, upgrading to a higher standard, unfreezing in a network, or increasing network signal strength.

14. The electronic device according to claim 11, wherein the program code executed by the processor, further causes the electronic device to:

switch, at the third location on the first route, from accessing the first mobile network by using the first SIM card to accessing the second mobile network by using the second SIM card; or, simultaneously access the first mobile network by using the first SIM card and access the second mobile network by using the second SIM card at the third location on the first route.

15. The electronic device according to claim 11, wherein the program code executed by the processor, further causes the electronic device to:

obtain the network information of the first mobile network in the process of moving along the first route and historical network information of the first mobile network in the process of moving along the first route, and predict that the first exception occurs in the first mobile network when the electronic device moves along the first route.

16. The electronic device according to claim 11, wherein when the predicting that the first exception occurs in the first mobile network when the electronic device moves along the first route, the accessing, by the electronic device, the second mobile network at the third location on the first route by using the second SIM card comprises:

when the electronic device predicts that the first exception occurs in the first mobile network, determining, by the electronic device, whether the second exception occurs in the second mobile network; and when determining that no exception occurs in the second mobile network, accessing, by the electronic device, the second mobile network at the third location on the first route by using the second SIM card.

17. The electronic device according to claim 11, wherein the first exception comprises at least one of the following: dropping from a network, falling into a lower standard, network freezing, or network signal strength decreasing.

18. The electronic device according to claim 11, wherein the program code executed by the processor, further causes the electronic device to:

after the electronic device arrives at the second location, stop, obtaining the network information of the first mobile network.

* * * * *